US011520399B2

(12) United States Patent
Kang et al.

(10) Patent No.: US 11,520,399 B2
(45) Date of Patent: Dec. 6, 2022

(54) INTERACTIVE AUGMENTED REALITY EXPERIENCES USING POSITIONAL TRACKING

(71) Applicants: Shin Hwun Kang, Playa Del Rey, CA (US); Ilteris Canberk, Marina Del Rey, CA (US); James Powderly, Venice, CA (US); Dmytro Kucher, Odessa (UA); Dmytro Hovorov, Luhansk (UA)

(72) Inventors: Shin Hwun Kang, Playa Del Rey, CA (US); Ilteris Canberk, Marina Del Rey, CA (US); James Powderly, Venice, CA (US); Dmytro Kucher, Odessa (UA); Dmytro Hovorov, Luhansk (UA)

(73) Assignee: Snap Inc., Santa Monica, CA (US)

( * ) Notice: Subject to any disclaimer, the term of this patent is extended or adjusted under 35 U.S.C. 154(b) by 52 days.

(21) Appl. No.: 16/883,612

(22) Filed: May 26, 2020

(65) Prior Publication Data

US 2021/0373650 A1 Dec. 2, 2021

(51) Int. Cl.
*A63F 13/46* (2014.01)
*A63F 13/577* (2014.01)
(Continued)

(52) U.S. Cl.
CPC .............. *G06F 3/011* (2013.01); *A63F 13/46* (2014.09); *A63F 13/577* (2014.09);
(Continued)

(58) Field of Classification Search
CPC .......... G06F 3/011; G06F 3/167; A63F 13/46; A63F 13/577; A63F 2300/8082;
(Continued)

(56) References Cited

U.S. PATENT DOCUMENTS

| 9,024,842 B1 | 5/2015 | Gomez et al. |
| 9,098,739 B2 | 8/2015 | Mutto et al. |

(Continued)

FOREIGN PATENT DOCUMENTS

| CN | 106199511 A | 12/2016 |
| EP | 3116615 A1 | 1/2017 |

(Continued)

OTHER PUBLICATIONS

International Search Report and Written Opinion for International Application No. PCT/US2021/033642, dated Aug. 30, 2021 (Aug. 30, 2021)—11 pages.

(Continued)

*Primary Examiner* — Jitesh Patel
(74) *Attorney, Agent, or Firm* — Culhane Meadows PLLC; Stephen J. Weed

(57) ABSTRACT

Interactive augmented reality experiences with an eyewear device including a position detection system and a display system. The eyewear device registers a first marker position for a user-controlled virtual game piece and a second marker for an interaction virtual game piece. The eyewear device monitors its position (e.g., location and orientation) and updates the position of the user-controlled virtual game piece accordingly. The eyewear device additionally monitors the position of the user-controlled virtual game piece with respect to the interaction virtual game piece for use in generating a score. Augmented reality examples include a "spheroidal balancing" augmented reality experience and a "spheroidal balancing" augmented reality experience.

20 Claims, 24 Drawing Sheets

(51) Int. Cl.
*G06T 7/73* (2017.01)
*G06F 3/01* (2006.01)
*G02B 27/01* (2006.01)
*G06F 3/16* (2006.01)

(52) U.S. Cl.
CPC ..... *G02B 27/0101* (2013.01); *G02B 27/0172* (2013.01); *G02B 27/0179* (2013.01); *G06F 3/167* (2013.01); *G06T 7/73* (2017.01); *A63F 2300/8082* (2013.01); *G02B 2027/0138* (2013.01); *G02B 2027/0178* (2013.01); *G02B 2027/0187* (2013.01); *G06T 2207/30208* (2013.01)

(58) Field of Classification Search
CPC ............ G06T 7/73; G06T 2207/30208; G02B 27/0172; G02B 27/0101; G02B 27/0179; G02B 2027/0187; G02B 2027/0138; G02B 2027/0178
See application file for complete search history.

(56) References Cited

U.S. PATENT DOCUMENTS

| | | | |
|---|---|---|---|
| 9,235,051 B2 | 1/2016 | Salter et al. | |
| 9,459,454 B1 | 10/2016 | The et al. | |
| 9,541,996 B1* | 1/2017 | Baxter | G06F 1/169 |
| 9,552,673 B2 | 1/2017 | Hilliges et al. | |
| 9,990,029 B2 | 6/2018 | Kochi | |
| 9,996,983 B2 | 6/2018 | Mullins | |
| 10,057,400 B1 | 8/2018 | Gordon et al. | |
| 10,146,414 B2 | 12/2018 | Heater | |
| 10,220,303 B1* | 3/2019 | Schmidt | A63F 13/42 |
| 10,372,228 B2 | 8/2019 | Mao et al. | |
| 10,394,334 B2 | 8/2019 | Wang | |
| 10,509,461 B2 | 12/2019 | Mullen | |
| 10,579,207 B2 | 3/2020 | Piya et al. | |
| 10,782,779 B1* | 9/2020 | Eubank | G06F 3/016 |
| 10,853,991 B1 | 12/2020 | Yan et al. | |
| 11,086,126 B1 | 8/2021 | Gollier et al. | |
| 2010/0085317 A1 | 4/2010 | Park et al. | |
| 2011/0213664 A1 | 9/2011 | Osterhout et al. | |
| 2012/0113223 A1 | 5/2012 | Hilliges et al. | |
| 2012/0327117 A1 | 12/2012 | Weller et al. | |
| 2013/0328927 A1 | 12/2013 | Mount et al. | |
| 2014/0043211 A1 | 2/2014 | Park | |
| 2014/0225918 A1 | 8/2014 | Mittal et al. | |
| 2014/0347289 A1 | 11/2014 | Suh et al. | |
| 2014/0361988 A1 | 12/2014 | Katz et al. | |
| 2014/0368533 A1 | 12/2014 | Salter et al. | |
| 2015/0049017 A1 | 2/2015 | Weber et al. | |
| 2015/0097719 A1 | 4/2015 | Balachandreswaran et al. | |
| 2015/0109197 A1 | 4/2015 | Takagi | |
| 2015/0317833 A1 | 11/2015 | Ebstyne et al. | |
| 2015/0331576 A1 | 11/2015 | Piya et al. | |
| 2015/0370321 A1 | 12/2015 | Lundberg | |
| 2016/0033770 A1 | 2/2016 | Fujimaki et al. | |
| 2016/0035134 A1 | 2/2016 | Tanaka et al. | |
| 2016/0260251 A1 | 9/2016 | Stafford et al. | |
| 2016/0261834 A1 | 9/2016 | Li et al. | |
| 2016/0306431 A1 | 10/2016 | Stafford et al. | |
| 2017/0014683 A1 | 1/2017 | Maruyama et al. | |
| 2017/0028299 A1 | 2/2017 | The et al. | |
| 2017/0053447 A1* | 2/2017 | Chen | G06T 17/20 |
| 2017/0124713 A1 | 5/2017 | Jurgenson et al. | |
| 2017/0140552 A1 | 5/2017 | Woo et al. | |
| 2017/0270711 A1 | 9/2017 | Schoenberg | |
| 2017/0293364 A1 | 10/2017 | Wang | |
| 2017/0295446 A1* | 10/2017 | Thagadur Shivappa | H04S 7/304 |
| 2017/0352184 A1 | 12/2017 | Poulos et al. | |
| 2017/0357334 A1 | 12/2017 | Balan et al. | |
| 2018/0005443 A1 | 1/2018 | Poulos et al. | |
| 2018/0024641 A1 | 1/2018 | Mao et al. | |
| 2018/0039852 A1 | 2/2018 | Nakamura et al. | |
| 2018/0075659 A1 | 3/2018 | Browy et al. | |
| 2018/0196503 A1 | 7/2018 | Ikeda et al. | |
| 2018/0259775 A1 | 9/2018 | Ono et al. | |
| 2018/0329209 A1 | 11/2018 | Nattukallingal | |
| 2019/0025595 A1 | 1/2019 | Fukuda et al. | |
| 2019/0102927 A1 | 4/2019 | Yokokawa | |
| 2019/0122085 A1 | 4/2019 | Tout et al. | |
| 2019/0220098 A1 | 7/2019 | Gupta | |
| 2019/0299059 A1* | 10/2019 | Case, Jr. | A63B 24/0075 |
| 2019/0318544 A1 | 10/2019 | Skidmore et al. | |
| 2019/0324553 A1 | 10/2019 | Liu et al. | |
| 2019/0325651 A1 | 10/2019 | Bradner et al. | |
| 2019/0361521 A1* | 11/2019 | Stellmach | G06F 3/04842 |
| 2019/0377416 A1 | 12/2019 | Alexander | |
| 2020/0005026 A1 | 1/2020 | Andersen et al. | |
| 2020/0064924 A1 | 2/2020 | Poupyrev et al. | |
| 2020/0097065 A1 | 3/2020 | Iyer et al. | |
| 2020/0218423 A1 | 7/2020 | Ohashi | |
| 2020/0311396 A1 | 10/2020 | Pollefeys et al. | |
| 2020/0312029 A1 | 10/2020 | Heinen et al. | |
| 2021/0019036 A1 | 1/2021 | Wang et al. | |
| 2021/0041702 A1 | 2/2021 | Kimura et al. | |
| 2021/0090337 A1 | 3/2021 | Ravasz et al. | |
| 2021/0096726 A1 | 4/2021 | Faulkner et al. | |
| 2021/0208698 A1 | 7/2021 | Martin et al. | |
| 2021/0209153 A1 | 7/2021 | Zhang | |
| 2021/0275914 A1* | 9/2021 | Wu | A63F 13/837 |

FOREIGN PATENT DOCUMENTS

| | | |
|---|---|---|
| EP | 3699736 A1 | 8/2020 |
| WO | 2015192117 A1 | 12/2015 |

OTHER PUBLICATIONS

Cas and Chary VR: https://www.youtube.com/watch?v=_8VqQfr-HG94, viewed on Dec. 4, 2021, published online on Feb. 25, 2020 (Year: 2020).

Engadget: "Google Glass Gesture Recognition by OnTheGo Platforms at CES 2014 : Engadget", Jan. 8, 2014 (Jan. 8, 2014), XP055859805, Retrieved from the Internet: URL:https://www.youtube.com/watch?v=d_jl_ZxPECg [retrieved on Nov. 11, 2021] 00:39s, 00:55s, 01:00-01:10s.

International Search Report and Written Opinion for International Application No. PCT/US2021/051109, dated Dec. 10, 2021 (Dec. 10, 2021)—17 pages.

Matthias Schwaller et al: "Pointing in the Air: Measuring the Effect of Hand Selection Strategies on Performance and Effort", Jul. 1, 2013 (Jul. 1, 2013), Human Factors in Computing and Informatics, Springer Berlin Heidelberg, Berlin, Heidelberg, pp. 732-747, XP047033542, ISBN: 978-3-642-39061-6, p. 740; figure 4.

Partial International Search Report and Written Opinion for International Application No. PCT/US2021/047637, dated Jan. 7, 2022 (Jan. 7, 2022)—10 pages.

Cirulis Arnis: "Large Scale Augmented Reality for Collaborative Environments", Jul. 10, 2020 (Jul. 10, 2020), Computer Vision—ECCV 2020: 16th European Conference, Glasgow, UK, Aug. 23-28, 2020: Proceedings; [Lecture Notes in Computer Science; ISSN 0302-9743], Springer International Publishing, Cham, pp. 325-335, XP047554326, ISBN: 978-3-030-58594-5.

International Search Report and Written Opinion for International Application No. PCT/US2021/063295, dated Mar. 17, 2022 (Mar. 17, 2022)—13 pages.

Chatain, Julia et al., "DigiGlo: Exploring the Palm as an Input and Display Mechanism through Digital Gloves," Association for Computing Machinery, CHI PLAY '20, Nov. 2-4, 2020, Virtual Event, Canada, 12 pages.

International Search Report and Written Opinion for International Application No. PCT/US2022/023608, dated Jul. 11, 2022 (dated Nov. 7, 2022)—12 pages.

International Search Report and Written Opinion for International Application No. PCT/US2022/024565, dated Jul. 25, 2022 (dated Jul. 25, 2022)—15 pages.

(56) References Cited

OTHER PUBLICATIONS

U.S. Appl. No. 17/589,065, filed Jan. 31, 2022 to Stolzenberg.
U.S. Appl. No. 17/714,352, filed Apr. 6, 2022 to Hwang et al.
U.S. Appl. No. 17/719,654, filed Apr. 13, 2022 to Hwang et al.

* cited by examiner

INTERACTIVE AUGMENTED REALITY EXPERIENCES USING POSITIONAL TRACKING

TECHNICAL FIELD

Examples set forth in the present disclosure relate to the field of augmented reality (AR) and wearable mobile devices such as eyewear devices. More particularly, but not by way of limitation, the present disclosure describes user interaction with virtual images to provide an interactive augmented reality experience.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems (e.g., touch-sensitive surfaces, pointers), peripheral devices, displays, and graphical user interfaces (GUIs) through which a user can interact with displayed content.

Augmented reality (AR) combines real objects in a physical environment with virtual objects and displays the combination to a user. The combined display gives the impression that the virtual objects are authentically present in the environment, especially when the virtual objects appear and behave like the real objects.

Advanced AR technologies, such as computer vision and object tracking, may be used to create a perceptually enriched and immersive experience. Computer vision algorithms extract three-dimensional data about the physical world from the data captured in digital images or video. Object recognition and tracking algorithms may be used to detect an object in a digital image or video, estimate its orientation or pose, and track its movement over time.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
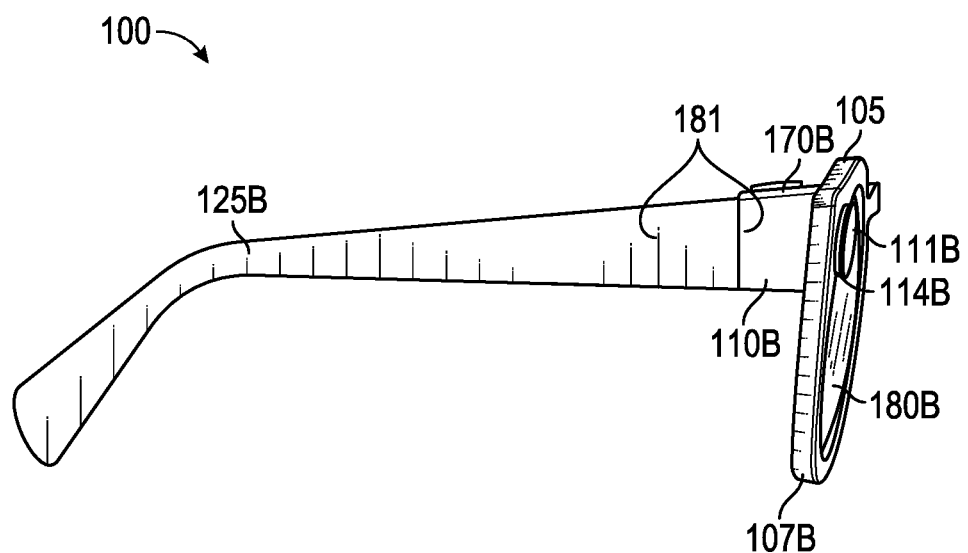
FIG. 1A is a side view (right) of an example hardware configuration of an eyewear device suitable for use in an augmented reality production system.

Various implementations and details are described with reference to examples including a system for providing an interactive augmented reality experience with an eyewear device including a position detection system and a display system. The eyewear device registers a first marker position for a user-controlled virtual game piece and a second marker for an interaction virtual game piece. The eyewear device monitors its position (e.g., location and orientation) and updates the position of the user-controlled virtual game piece accordingly. The eyewear device additionally monitors the position of the user-controlled virtual game piece with respect to the interaction virtual game piece for use in generating a score. Two examples that are described below are a "beat walk" augmented reality experience and a "spheroidal balancing" augmented reality experience.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
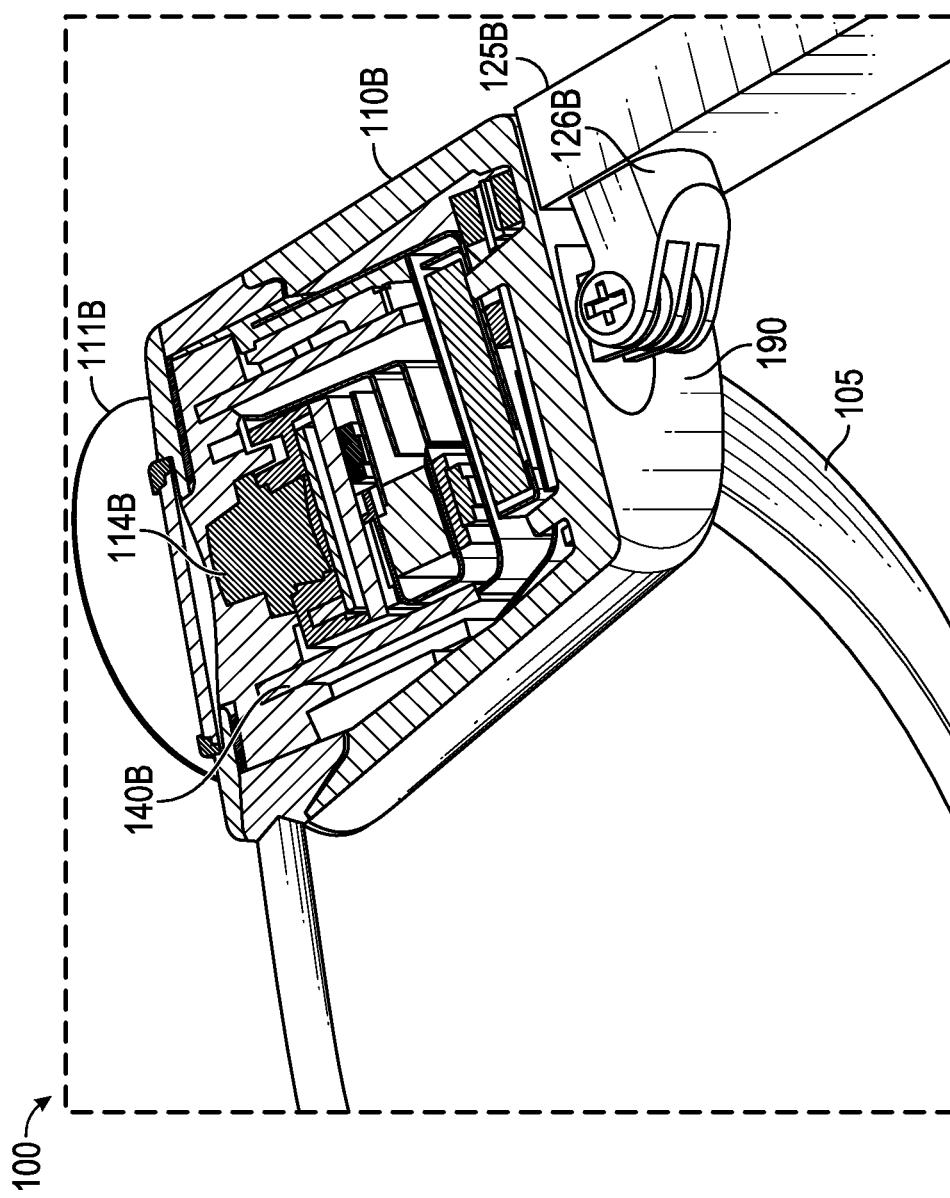
FIG. 1B is a perspective, partly sectional view of a right corner of the eyewear device of FIG. 1A depicting a right visible-light camera, and a circuit board.
Figure 1C:
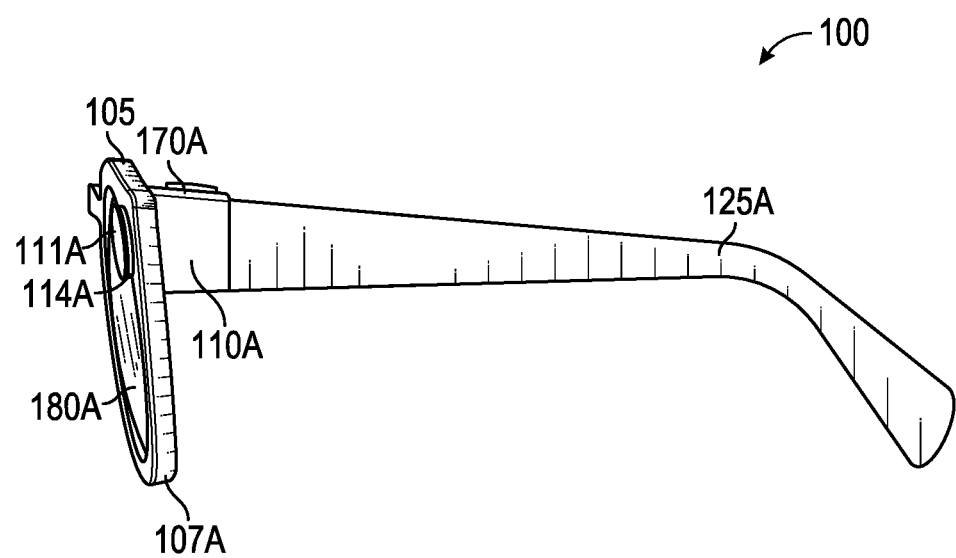
FIG. 1C is a side view (left) of an example hardware configuration of the eyewear device of FIG. 1A, which shows a left visible-light camera.
Figure 1D:
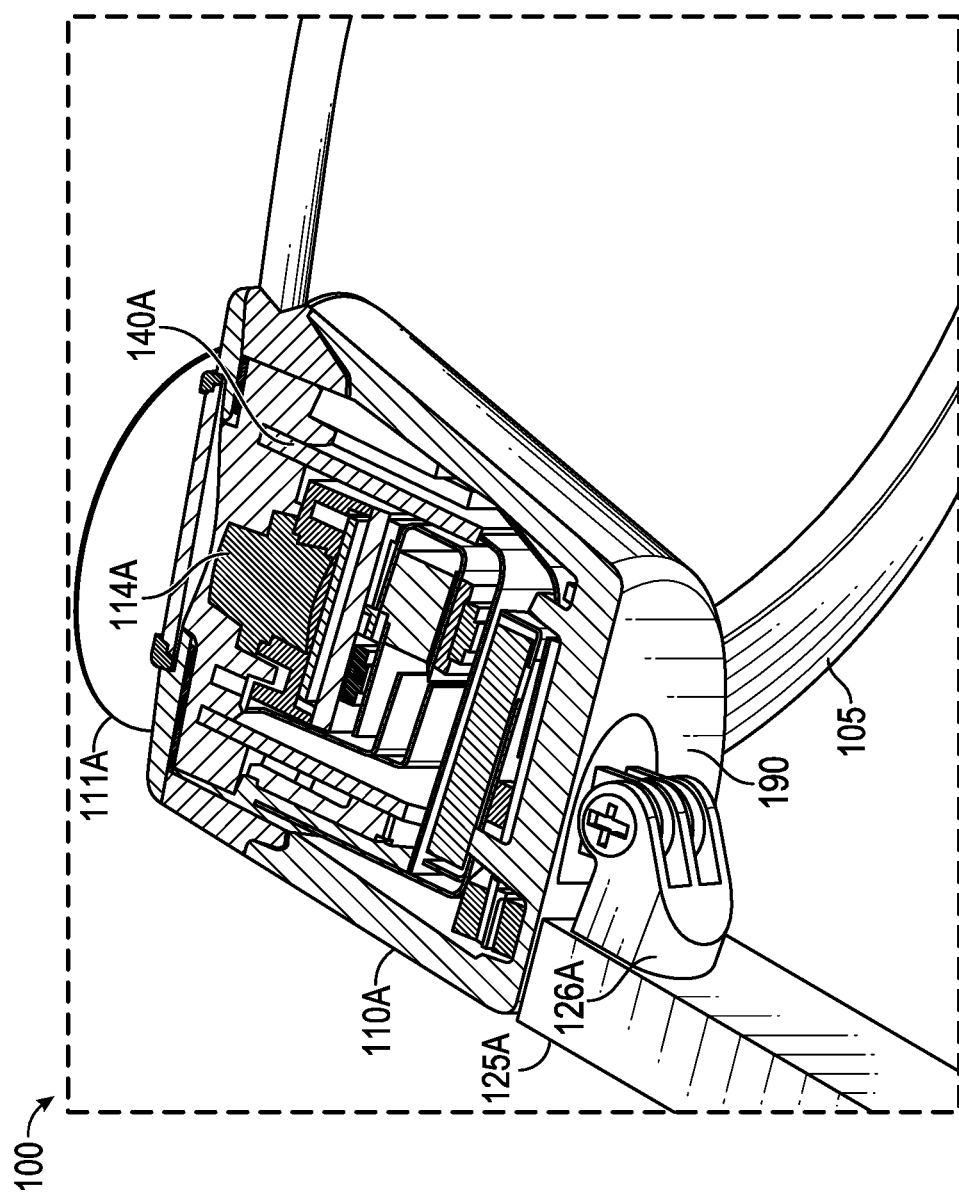
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
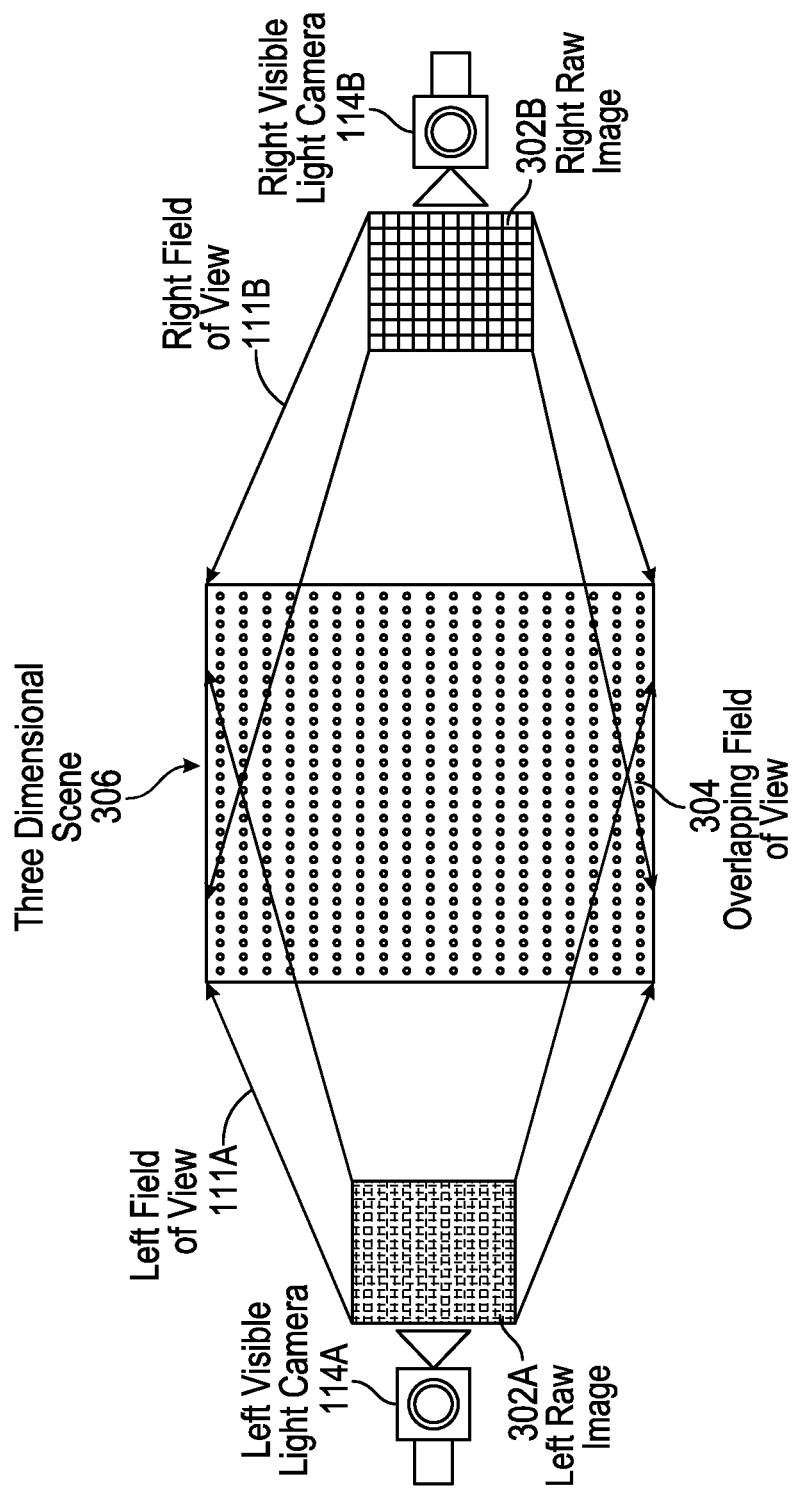
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example, visible-light cameras 114A, 114B have a field of view with an angle of view between 15° to 30°, for example 24°, and have a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
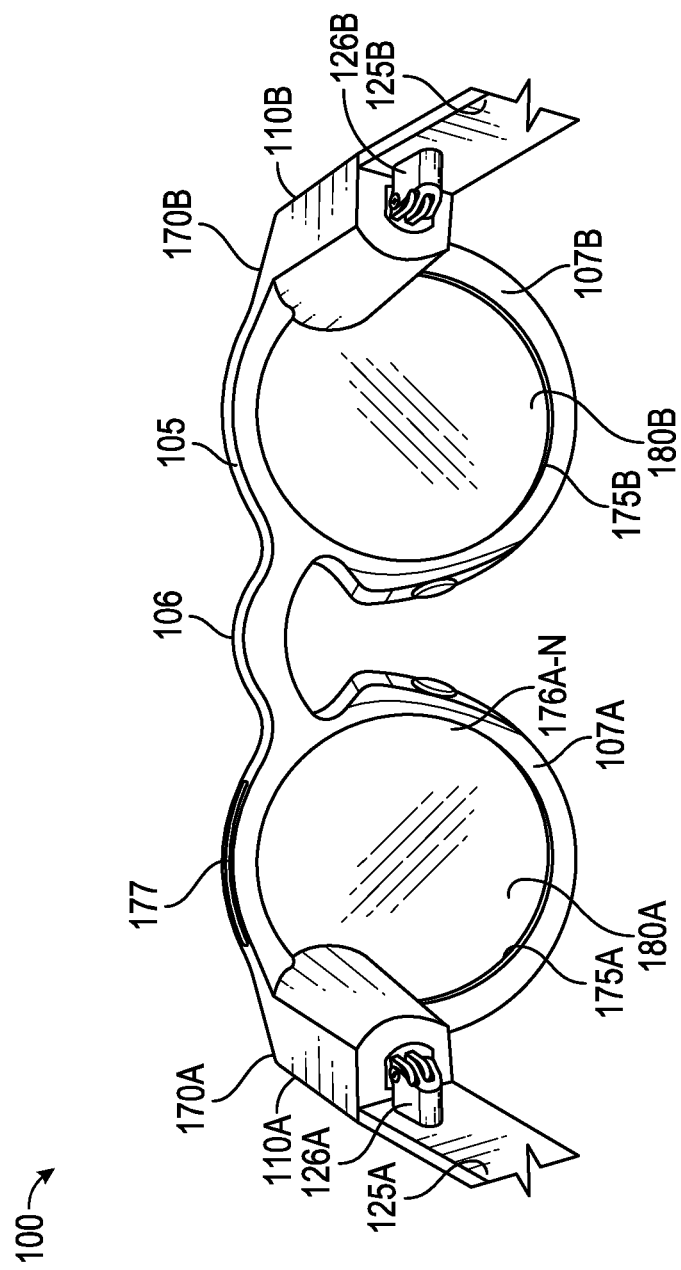
FIGS. 2A and 2B are rear views of example hardware configurations of an eyewear device utilized in the augmented reality production system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
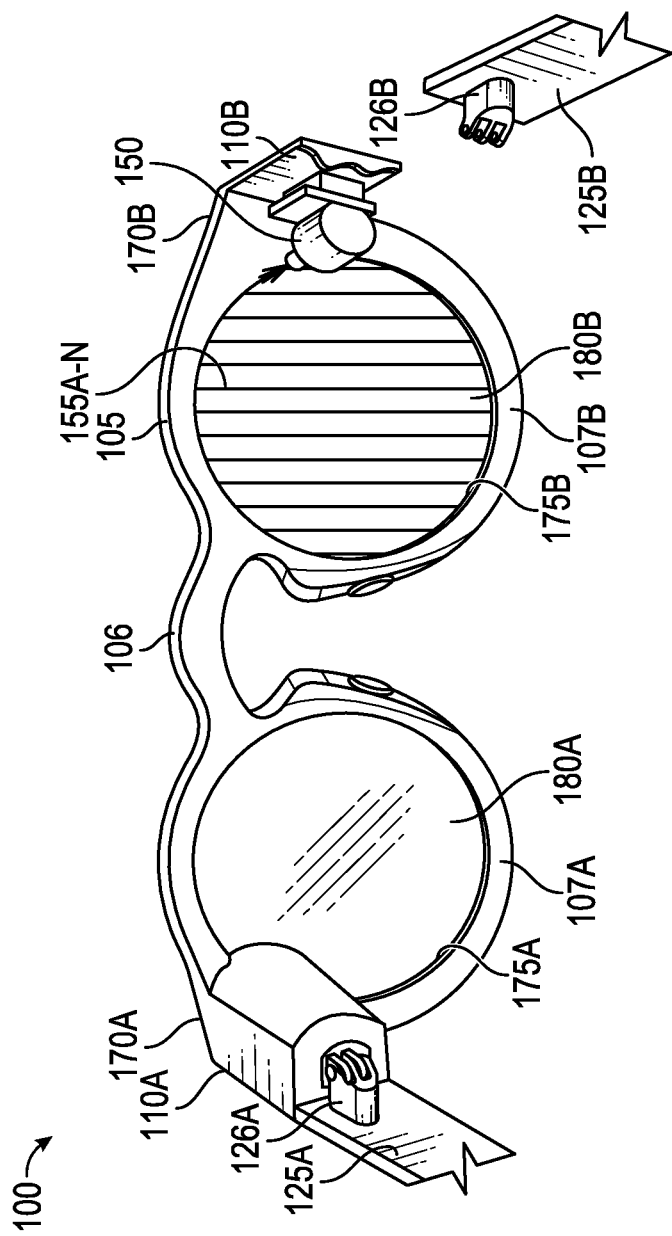

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double prime, A through N, not shown) which are configured to interact with light from the right projector 150B. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the interactive augmented reality system 400 (FIG. 4) includes the eyewear device 100, which includes a frame 105 and a left temple 110A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 110A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
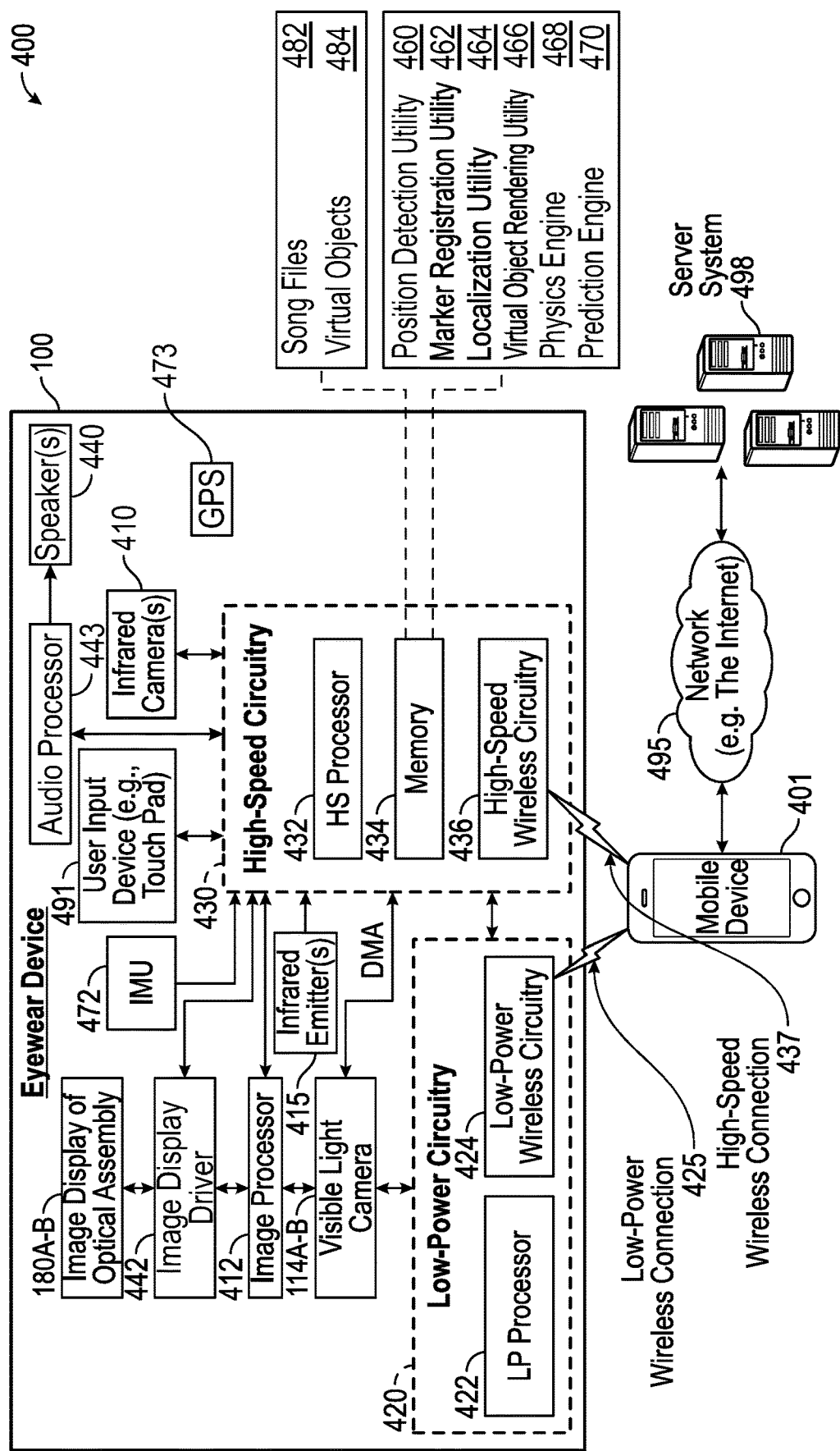
FIG. 4 is a functional block diagram of an example augmented reality production system including a wearable device (e.g., an eyewear device) and a server system connected via various networks.

FIG. 4 is a functional block diagram of an example interactive augmented reality system 400 that includes a wearable device (e.g., an eyewear device 100), a mobile device 401, and a server system 498 connected via various networks 495 such as the Internet. The interactive augmented reality system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
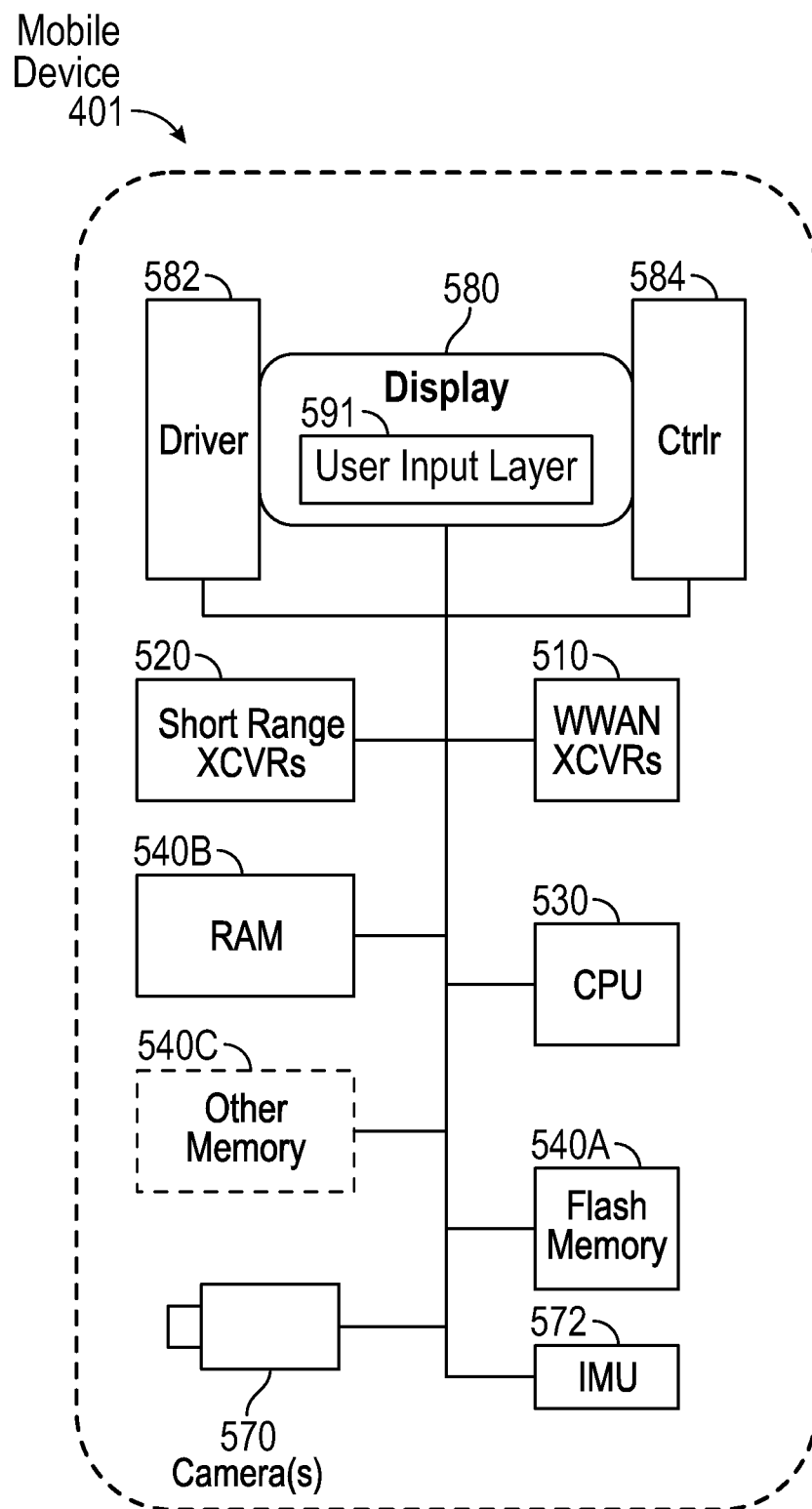
FIG. 5 is a diagrammatic representation of an example hardware configuration for a mobile device of the augmented reality production system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The interactive augmented reality system 400, as shown in FIG. 4, includes a computing device, such as mobile device 401, coupled to an eyewear device 100 over a network. The interactive augmented reality system 400 includes a memory for storing instructions and a processor for executing the instructions. Execution of the instructions of the interactive augmented reality system 400 by the processor 432 configures the eyewear device 100 to cooperate with the mobile device 401. The interactive augmented reality system 400 may utilize the memory 434 of the eyewear device 100 or the memory elements 540A, 540B, 540C of the mobile device 401 (FIG. 5). Also, the interactive augmented reality system 400 may utilize the processor elements 432, 422 of the eyewear device 100 or the central processing unit (CPU) 530 of the mobile device 401 (FIG. 5). In addition, the interactive augmented reality system 400 may further utilize the memory and processor elements of the server system 498. In this aspect, the memory and processing functions of the interactive augmented reality system 400 can be shared or distributed across the eyewear device 100, the mobile device 401, and the server system 498.

The memory 434 includes song files 482 and virtual objects 484. The song files 482 includes a tempo (e.g., beat track) and, optionally, a sequence of notes and note values. A note is a symbol denoting a particular pitch or other musical sound. The note value includes the duration the note is played, relative to the tempo, and may include other qualities such as loudness, emphasis, articulation, and phrasing relative to other notes. The tempo, in some implementations, includes a default value along with a user interface through which the user may select a particular tempo for use during playback of the song. The virtual objects 484 include image data for identifying objects or features in images captured by the cameras 114. The objects may be physical features such as known paintings or physical markers for use in localizing the eyewear device 100 within an environment.

The memory 434 additionally includes, for execution by the processor 432, a position detection utility 460, a marker registration utility 462, a localization utility 464, a virtual object rendering utility 466, a physics engine 468, and a prediction engine 470. The position detection utility 460 configures the processor 432 to determine the position (location and orientation) within an environment, e.g., using the localization utility 464. The marker registration utility 462 configures the processor 432 to register markers within the environment. The markers may be predefined physical markers having a known location within an environment or assigned by the processor 432 to a particular location with respect to the environment within which the eyewear device 100 is operating or with respect to the eyewear itself. The localization utility 464 configures the processor 432 to obtain localization data for use in determining the position of the eyewear device 100, virtual objects presented by the eyewear device, or a combination thereof. The location data may be derived from a series of images, an IMU unit 472, a GPS unit 473, or a combination thereof. The virtual object rendering utility 466 configures the processor 432 to render virtual images for display by the image display 180 under control of the image display driver 442 and the image processor 412. The physics engine 468 configures the processor 432 to apply laws of physics such as gravity and friction to the virtual word, e.g., between virtual game pieces. The prediction engine 470 configures the processor 432 to predict anticipated movement of an object such as the eyewear device 100 based on its current heading, input from sensors such as the IMU 472, images of the environment, or a combination thereof.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 891 for receiving input (by touch, multi-touch, or gesture, and the like, by hand, stylus or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions.

Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection.

Sensor data includes images received from one or both of the cameras 114A, 114B, distance(s) received from a laser range finder, position information received from a GPS unit 473, or a combination of two or more of such sensor data, or from other sensors providing data useful in determining positional information.

Figure 6:
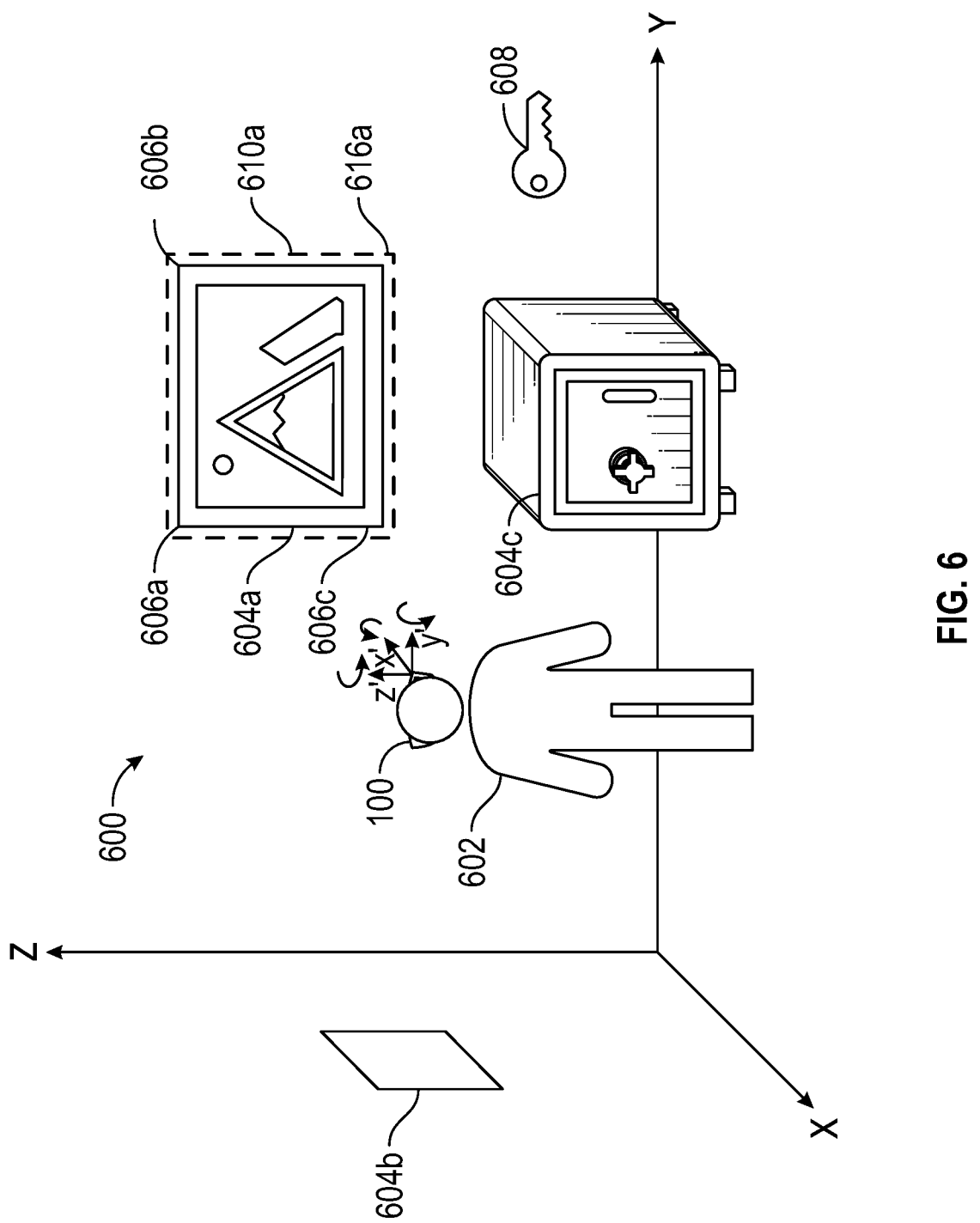
FIG. 6 is a schematic illustration of a user in an example environment for use in describing simultaneous localization and mapping.

FIG. 6 depicts an example environment 600 along with elements that are useful for natural feature tracking (NFT; e.g., a tracking application using a SLAM algorithm). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position a virtual object 408 (such as the key shown in FIG. 6) within the environment 600 for augmented reality viewing via image displays 180.

Figure 7:
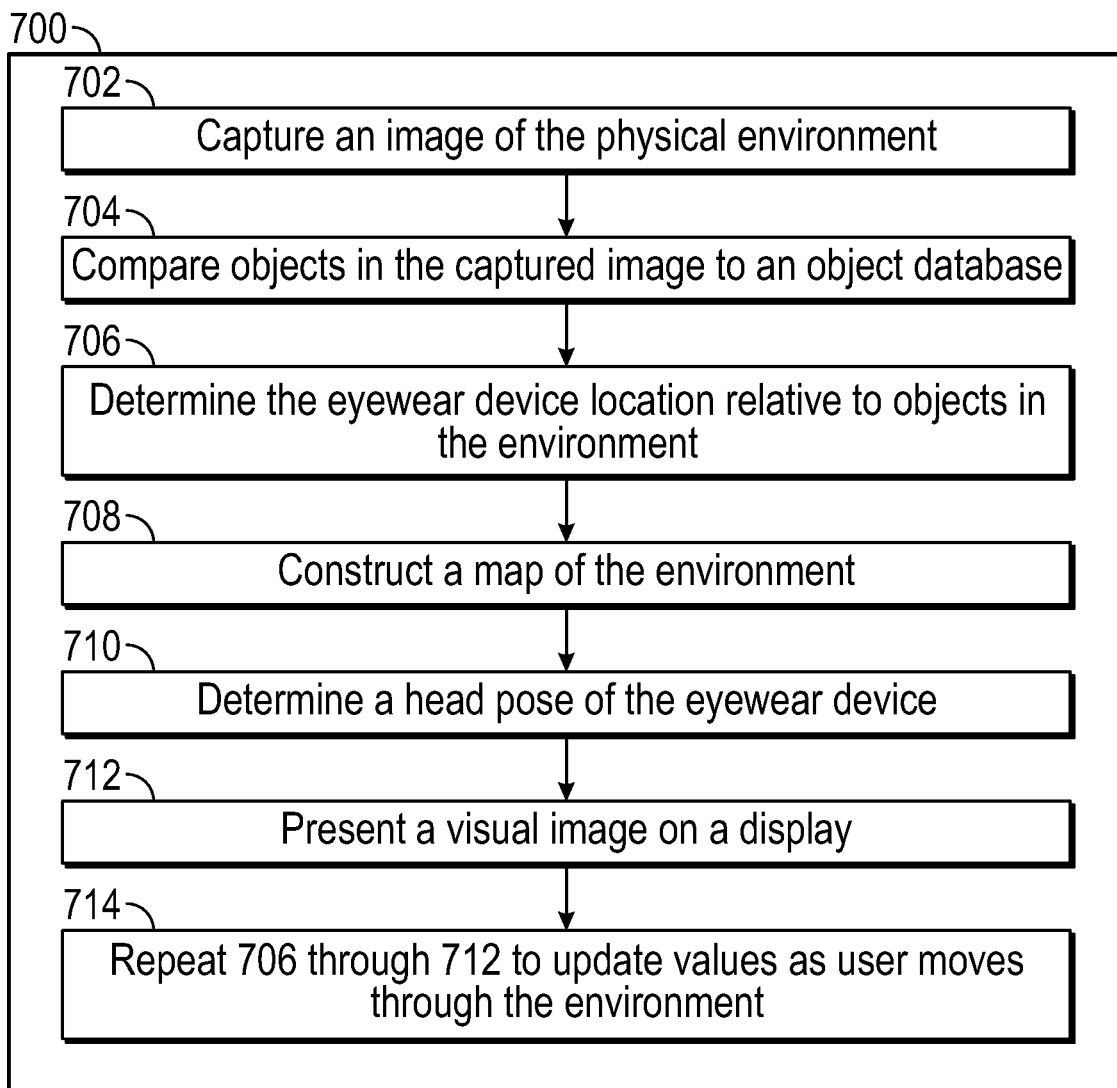
FIG. 7 is a flow chart listing steps in an example method of displaying virtual objects in a physical environment.

FIG. 7 is a flow chart 700 depicting a method for implementing augmented reality applications described herein on a wearable device (e.g., an eyewear device). Although the steps are described with reference to the eyewear device 100, as described herein, other implementations of the steps described, for other types of devices, will be understood by one of skill in the art from the description herein. Additionally, it is contemplated that one or more of the steps shown in FIG. 7, and in other figures, and described herein may be omitted, performed simultaneously or in a series, performed in an order other than illustrated and described, or performed in conjunction with additional steps.

At block 702, the eyewear device 100 captures one or more input images of a physical environment 600 near the eyewear device 100. The processor 432 may continuously receive input images from the visible light camera(s) 114 and store those images in memory 434 for processing. Additionally, the eyewear device 100 may capture information from other sensors (e.g., location information from a GPS unit 473, orientation information from an IMU 472, or distance information from a laser distance sensor).

At block 704, the eyewear device 100 compares objects in the captured images to objects stored in a library of images to identify a match. In some implementations, the processor 432 stores the captured images in memory 434. A library of images of known objects is stored in a virtual object database 484.

In one example, the processor 432 is programmed to identify a predefined particular object (e.g., a particular picture 604a hanging in a known location on a wall, a window 604b in another wall, or an object such as a safe 604c positioned on the floor). Other sensor data, such as GPS data, may be used to narrow down the number of known objects for use in the comparison (e.g., only images associated with a room identified through GPS coordinates). In another example, the processor 432 is programmed to identify predefined general objects (such as one or more trees within a park).

At block 706, the eyewear device 100 determines its position with respect to the object(s). The processor 432 may determine its position with respect to the objects by comparing and processing distances between two or more points in the captured images (e.g., between two or more location points on one objects 604 or between a location point 606 on each of two objects 604) to known distances between corresponding points in the identified objects. Distances between the points of the captured images greater than the points of the identified objects indicates the eyewear device 100 is closer to the identified object than the imager that captured the image including the identified object. On the other hand, distances between the points of the captured images less than the points of the identified objects indicates the eyewear device 100 is further from the identified object than the imager that captured the image including the identified object. By processing the relative distances, the processor 432 is able to determine the position within respect to the objects(s). Alternatively, or additionally, other sensor information, such as laser distance sensor information, may be used to determine position with respect to the object(s).

At block 708, the eyewear device 100 constructs a map of an environment 600 surrounding the eyewear device 100 and determines its location within the environment. In one example, where the identified object (block 704) has a predefined coordinate system (x, y, z), the processor 432 of the eyewear device 100 constructs the map using that predefined coordinate system and determines its position within that coordinate system based on the determined positions (block 706) with respect to the identified objects. In another example, the eyewear device constructs a map using images of permanent or semi-permanent objects 604 within an environment (e.g., a tree or a park bench within a park). In accordance with this example, the eyewear device 100 may define the coordinate system (x', y', z') used for the environment.

At block 710, the eyewear device 100 determines a head pose (roll, pitch, and yaw) of the eyewear device 100 within the environment. The processor 432 determines head pose by using two or more location points (e.g., three location points 606a, 606b, and 606c) on one or more objects 604 or by using one or more location points 606 on two or more objects 604. Using conventional image processing algorithms, the processor 432 determines roll, pitch, and yaw by comparing the angle and length of a lines extending between the location points for the captured images and the known images.

At block 712, the eyewear device 100 presents visual images to the user. The processor 432 presents images to the user on the image displays 180 using the image processor 412 and the image display driver 442. The processor develops and presents the visual images via the image displays responsive to the location of the eyewear device 100 within the environment 600.

At block 714, the steps described above with reference to blocks 706-712 are repeated to update the position of the eyewear device 100 and what is viewed by the user 602 as the user moves through the environment 600.

Referring again to FIG. 6, the method of implementing interactive augmented reality applications described herein, in this example, includes a virtual marker 610a associated with a virtual object(s) 608 in the environment 600. In an AR system, markers are registered at locations in the environment to assist devices with the task of tracking and updating the location of users, devices, and objects (virtual and physical) in a mapped environment. Markers are sometimes registered to a high-contrast physical object, such as the relatively dark object 604a mounted on a lighter-colored wall, to assist cameras and other sensors with the task of detecting the marker. The markers may be preassigned or may be assigned by the eyewear device 100 upon entering the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

FIGS. 8A-8D are a flow charts 800, 820, 830, and 840 listing steps in an example method of an interactive augmented reality experience. Although the steps are described with reference to the eyewear device 100, as described herein, other implementations of the steps described, for other types of wearable mobile devices, will be understood by one of skill in the art from the description herein. Additionally, it is contemplated that one or more of the steps shown in FIGS. 8A-D, and described herein, may be omitted, performed simultaneously or in a series, performed in an order other than illustrated and described, or performed in conjunction with additional steps.

Figure 8A:
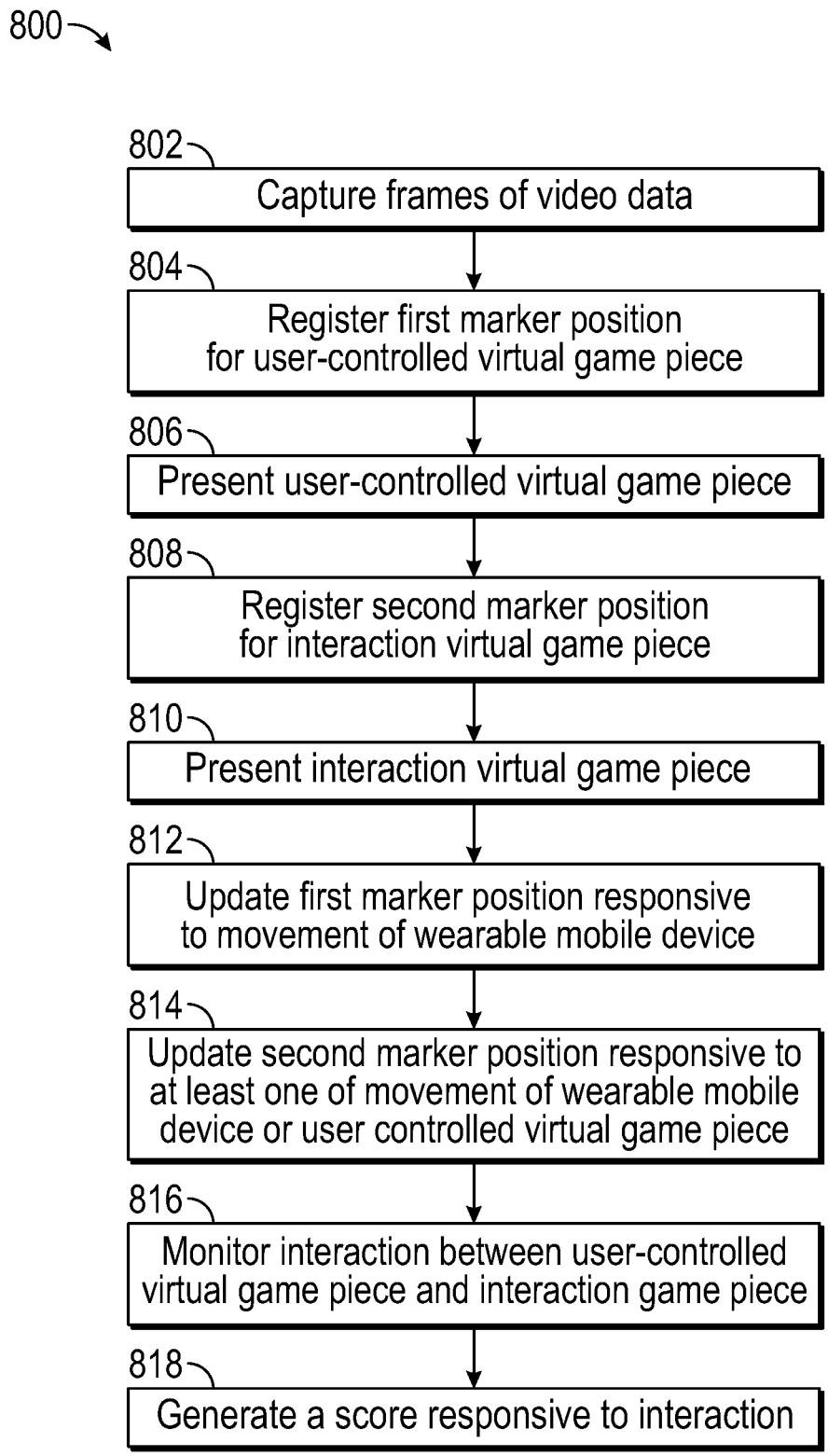
FIGS. 8A, 8B, 8C, and 8D are flow charts listing the steps in an example interactive augmented reality experience.

In FIG. 8A, at block 802, processor 432 capture sequences of frames of video data with a camera 114A, 114B that is coupled to or part of an eyewear device 100. The camera 114A, 114B, in some implementations, includes one or more high-resolution, digital cameras equipped with a CMOS image sensor capable of capturing high-definition still images and high-definition video. Each frame of digital video includes depth information for a plurality of pixels in the image. In this aspect, the camera 114A, 114B serves as a high-definition scanner by capturing a detailed input image of the environment. The camera 114A, 114B, in some implementations, includes a pair of high-resolution digital cameras 114A, 114B coupled to the eyewear device 100 and spaced apart to acquire a left-camera raw image and a right-camera raw image. When combined, the raw images form an input image that includes a matrix of three-dimensional pixel locations. The method, at step 802, in some implementations, includes storing the captured sequences of frames of video data in memory 434 on the eyewear device 100, at least temporarily, such that the frames are available for analysis, e.g., to determine position of the eyewear device 100 with respect to other objects in the environment and to track movement through the environment.

Movements of the eyewear device 100 changes the position and orientation from which the camera captures the sequences of frames of video data. The sequence of frames of video data may be used to localize the position of the eyewear device 100 within the environment and update the position as the wearer/user moves through the environment. In this aspect, the method continually updates the current local position of the eyewear device 100 as the wearer moves relative to the physical environment, so that the virtual objects presented are persistently viewable in a logically authentic location relative to the physical environment.

Figure 9A:
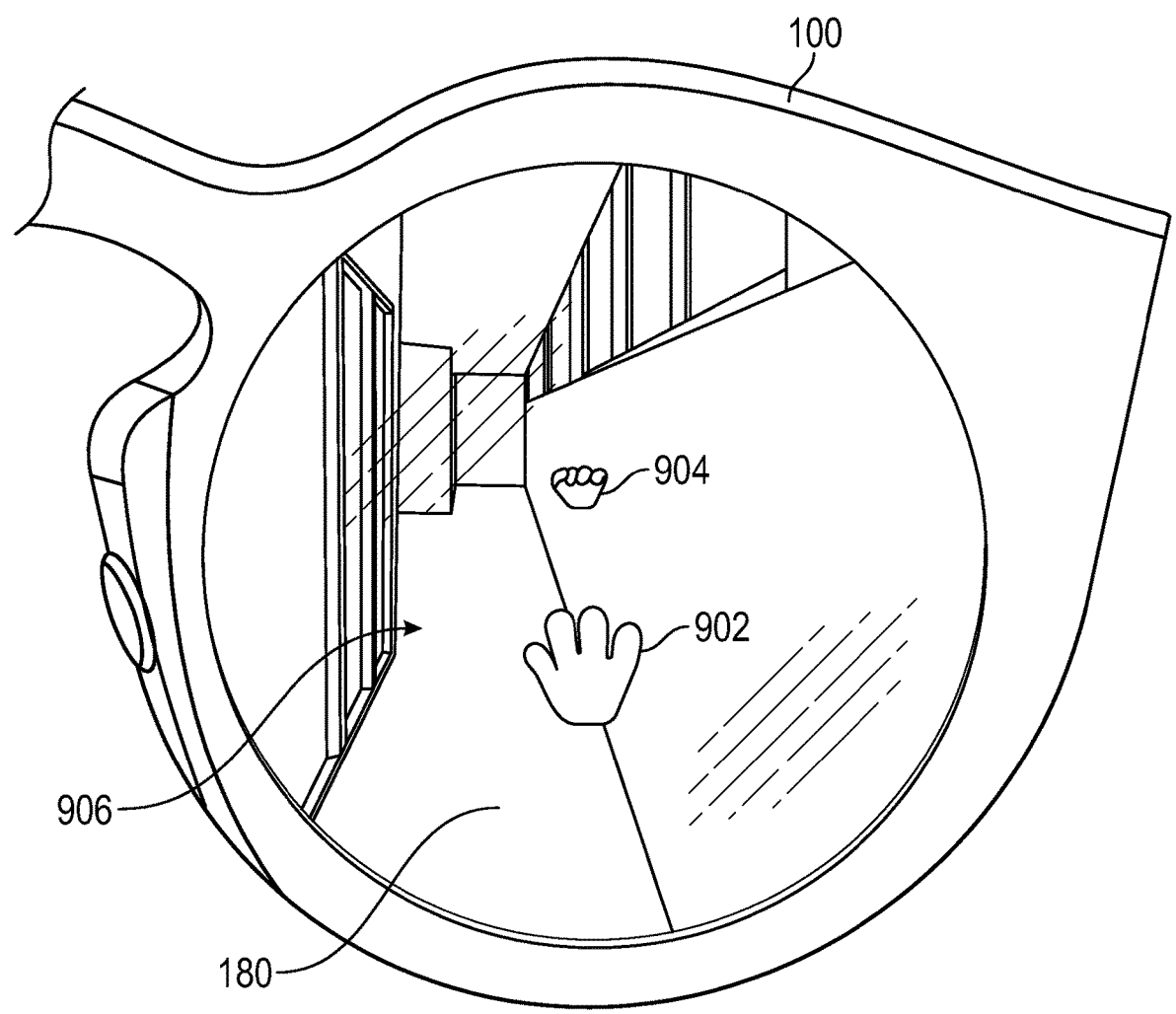
FIGS. 9A, 9B, and 9E are perspective illustrations of a virtual high-five augmented reality experience.
Figure 10A:
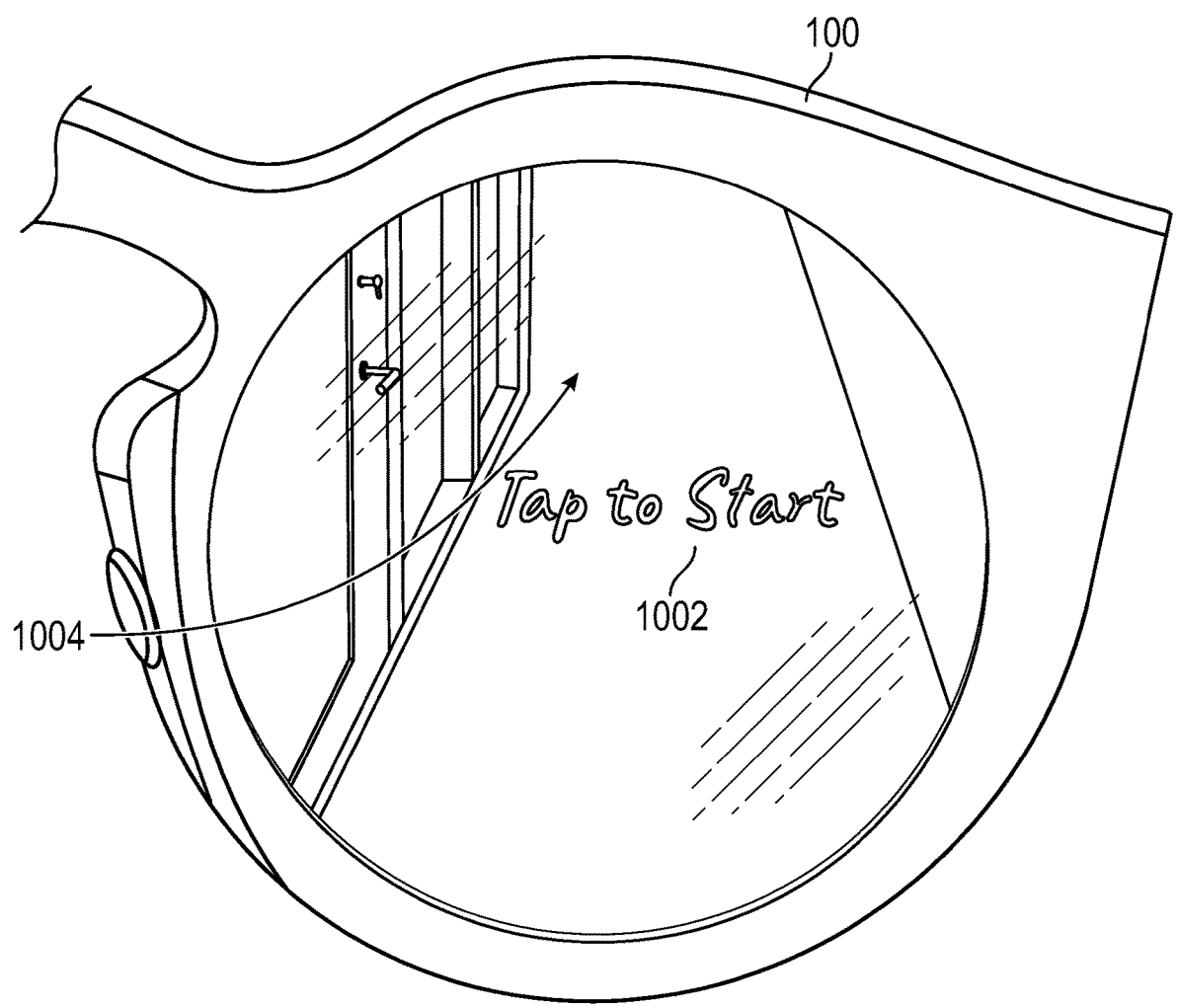
FIGS. 10A, 10B, 10C, and 10D are perspective illustrations of a virtual spheroidal balancing augmented reality experience.
Figure 10B:
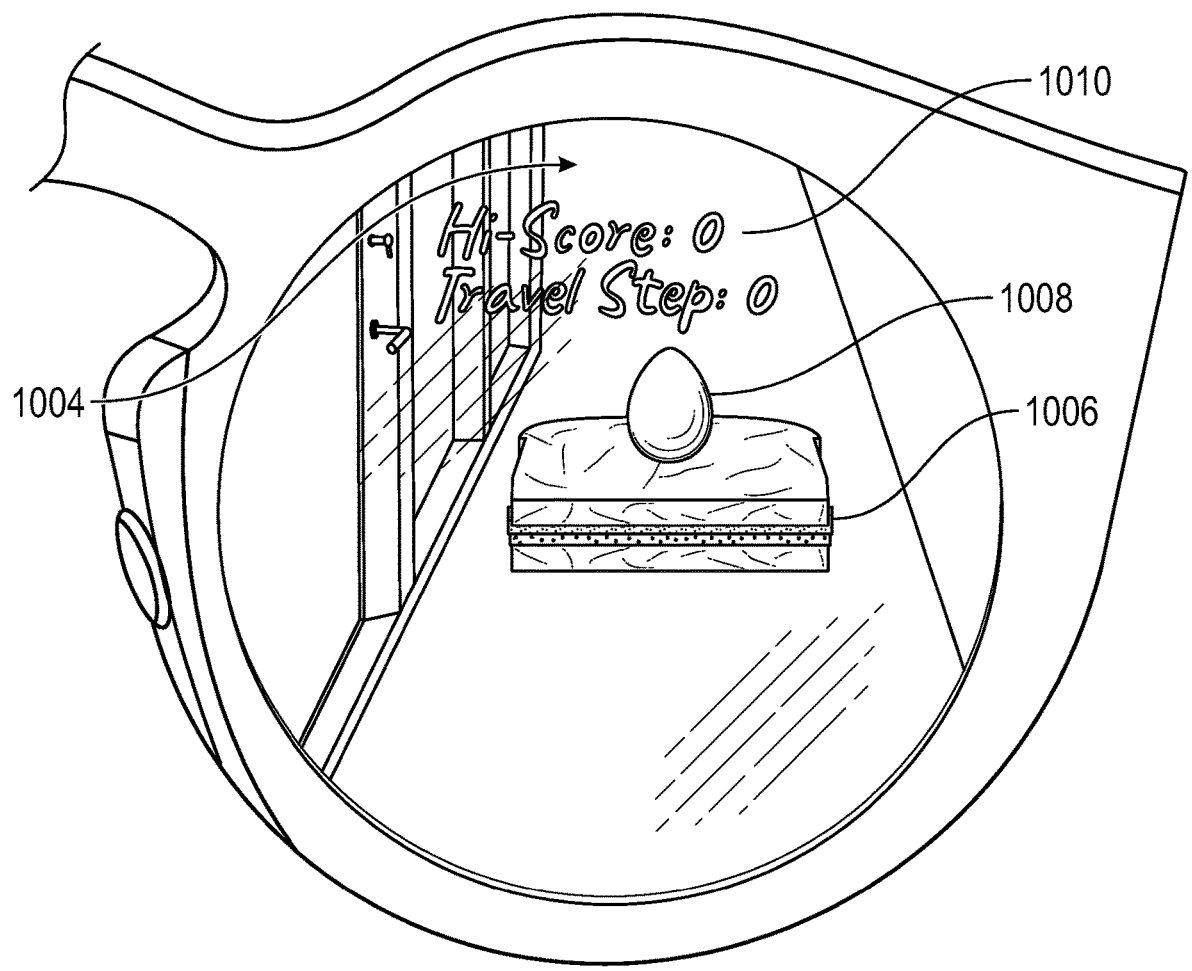
Figure 10C:
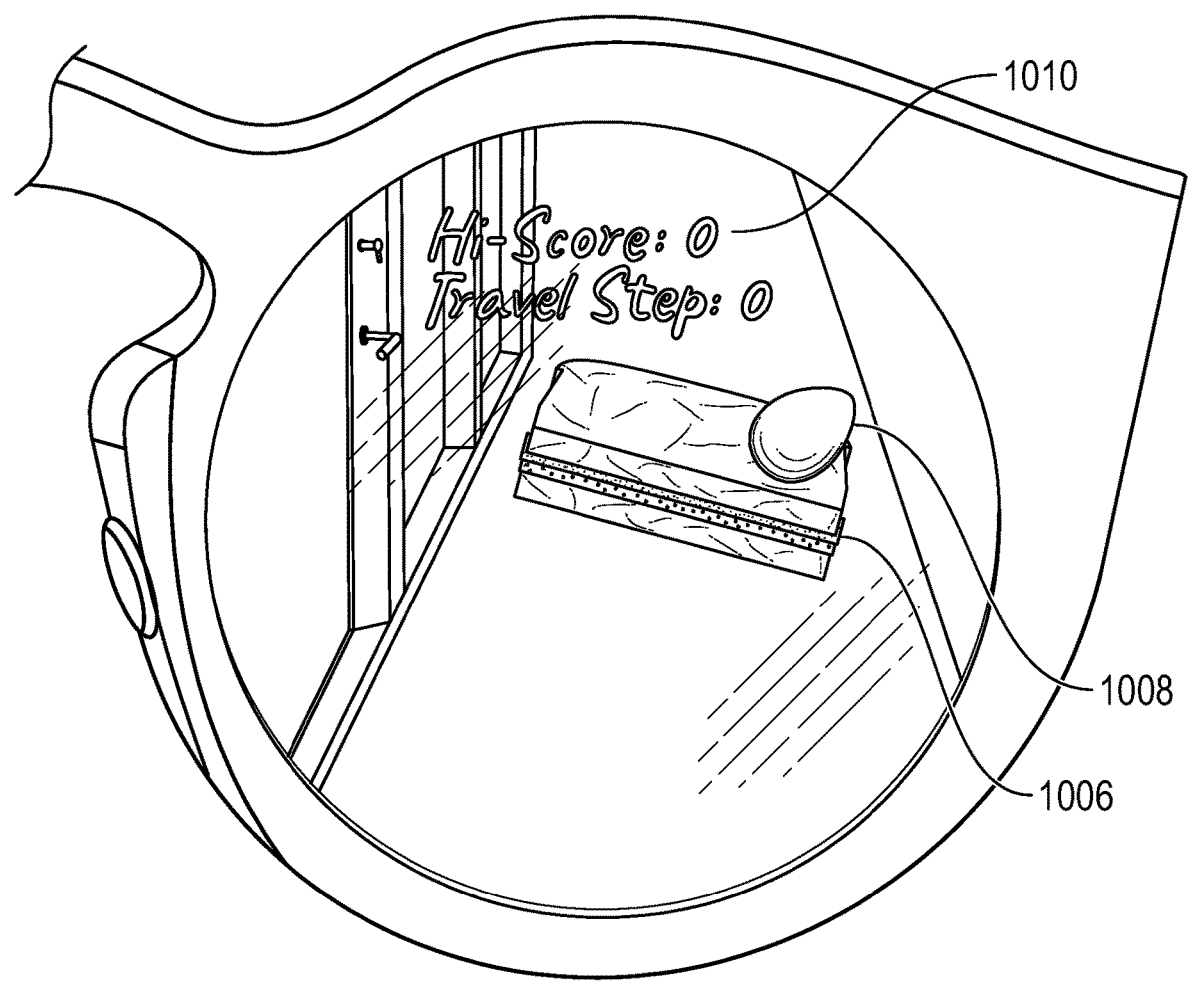

At block 804, processor 432 registers a first marker location for a user-controlled virtual game piece (e.g., a hand 902 as illustrated in FIG. 9A or a sandwich 1006 as illustrated in FIG. 10B). The processor 432, using the marker registration utility 462, selects and registers a marker location with respect to the current position of the eyewear device 100. In accordance with this example, the processor 432 determines its position based on frames of video data and determines the position of the first marker with respect to its position, an object in the environment, or both, e.g., 12 inches to the right, 6 inches down, and 18 inches to the front of the eyewear device 100 for the hand 902 in FIG. 9A or 36 inches directly to the front of the eyewear device 100 and 36 inches above the floor for the sandwich 1006 in FIG. 10B. Marker registration includes storing the marker location in memory, e.g., the memory 434. In one example, the marker location includes a set of three-dimensional marker coordinates based on or correlated with depth information obtained from a digital image or a frame of digital video. In another example, the marker location includes a set of three-dimensional marker coordinates based on or correlated with GPS information or other positional information obtained by the processor 432.

The marker location, in some implementations, coincides with an origin point (0, 0, 0) for a marker coordinate system. The marker coordinate system may be used as a reference for the marker location as well as a variety of other locations on or near where the marker is placed. In one example, the origin point corresponds to the eyewear device 100 and all marker positions are defined with respect to the eyewear device 100.

At block 806, the processor 432 presents the user-controlled virtual game piece at the first marker position. The image processor 412 presents the user-controlled virtual game piece on the image display 180A-B using the image display driver 442 such that is appears at the first marker position. For example, using the location and orientation results obtained from localization using the captured frames of video data (step 802) and, in some implementations, using a virtual object rendering utility 466, the eyewear device 100 executes the step 806 of presenting the user-controlled virtual game piece on the display in a size, shape, and orientation that is correlated with the marker location. The user-controlled virtual game piece is presented on one or both lenses of the eyewear device 100, facilitating a view of both the virtual game piece and the physical environment. For example, the right lens (right optical assembly 180B) includes a right display matrix 177B configured to interact with light from a right projector 150B positioned to project images onto the interior surface of the lens 180B. In this aspect, the virtual game piece is presented as an overlay relative to the physical environment, such that the virtual game piece is persistently viewable.

At block 808, the processor 432 registers a second marker location for an interaction virtual game piece (e.g., the other hand 904 as illustrated in FIG. 9A or a spheroidal object such as the egg 1008 as illustrated in FIG. 10A). The processor 432, using the marker registration utility 462, selects and registers the second marker location with respect to the current position of the eyewear device 100, the first marker location, or a combination thereof. In one example, the second marker position is defined with respect with respect to the eyewear device 100, e.g., 72 inches in front of the eyewear device 100 (such as the other hand 904 in FIG. 9A). In another example, the second marker position is device with respect to the first marker location, e.g., centered on a top surface of a virtual object associated with the first marker location (such as the 1008 centered on the top of the sandwich 1006 in FIG. 10A).

At block 810, the processor 432 presents the interaction virtual game piece at the second marker position. The image processor 412 presents the interaction virtual game piece on the image display 180A-B using the image display driver 442 such that it appears at the second marker position, e.g., as described above for the user-controlled virtual game piece.

At block 812, the processor 432 updates the first marker position responsive to movement of the eyewear device 100. The image processor 412 updates the first marker position (and, thus, the apparent position of the user-controlled virtual game piece) based on the position (location and orientation) of the eyewear device 100. In one example, the image processor 412 updates the first marker position such that the user-controlled virtual game piece remains at a fixed position with respect to the position of the eyewear device 100.

At block 814, the processor 432 updates the second marker position responsive to at least one of movement of eyewear device 100 or user-controlled virtual game piece. The image processor 412 updates the second marker position based on the position (location and orientation) of the eyewear device 100, the first marker position, objects in the environment, or a combination thereof. In one example, the image processor 412 updates the second marker position such that the interaction virtual game piece is positioned along a predicted path of the eyewear device 100. In another example, the image processor 412 updates the second marker position by applying a physics engine 468 at the interface between the interaction virtual game piece (e.g., spheroidal object such as the egg 1008) and the user-controlled virtual game piece (e.g., planar surface of the sandwich 1006).

Figure 9B:
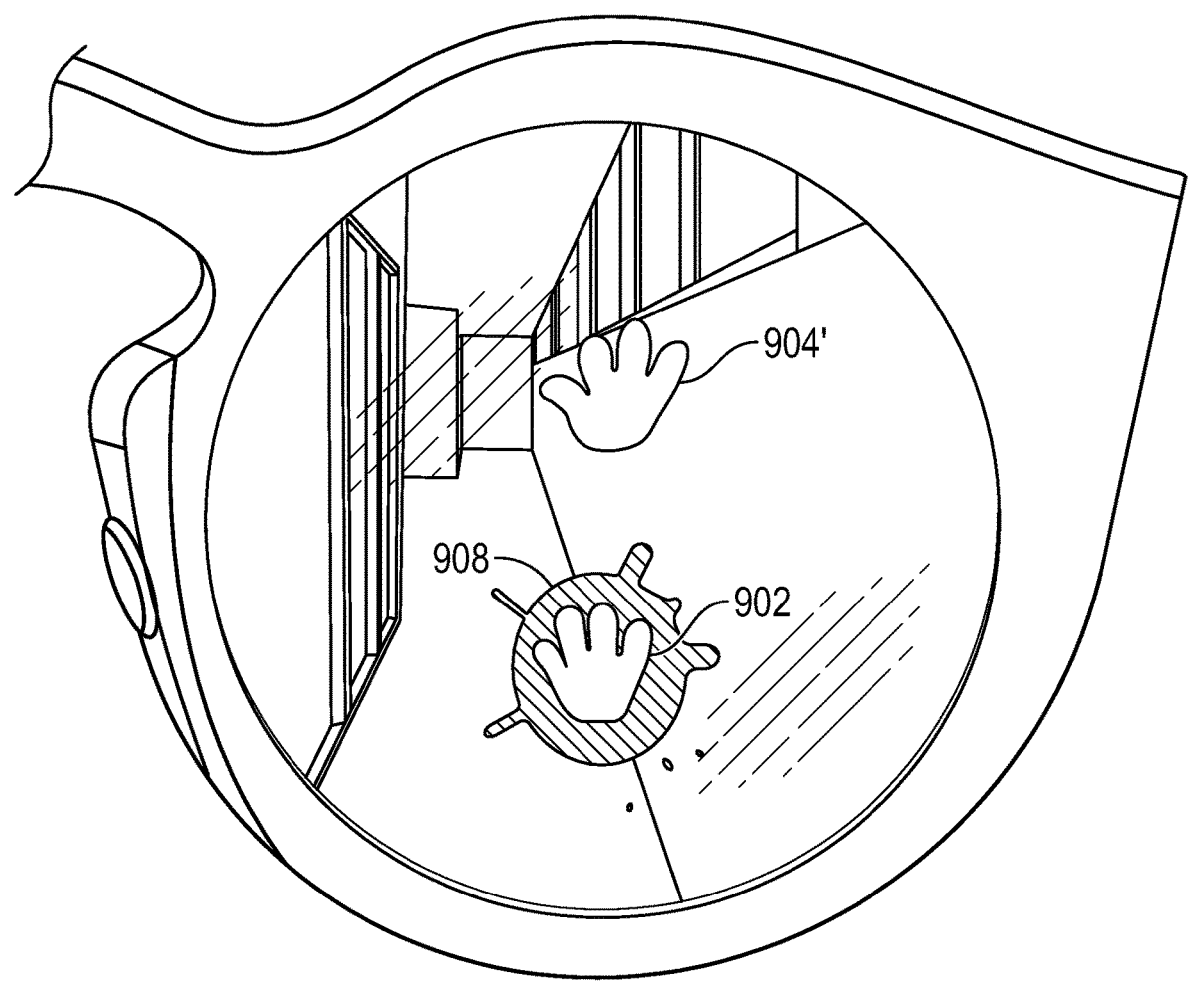

In one example, the processor 432 further updates the appearance of the virtual game pieces responsive to the relative position between the user-controlled virtual game piece and the interaction game piece. For example, when the virtual game pieces are greater than or equal to a first predefined distance the interaction virtual game piece may have a first appearance (e.g., a closed hand 904 such as depicted in FIG. 9A) and when the virtual game pieces are within the first predefined distance the interaction virtual game piece may have a second appearance (e.g., an open hand 904' such as depicted in FIG. 9B.

In another example, the processor 432 further updates the appearance of the virtual game pieces responsive to the environment. For example, when the interaction game piece is not in contact with the floor the interaction virtual game piece may have a first appearance (e.g., a whole egg 1008 such as depicted in FIG. 10B) and when the virtual game piece contacts the floor the interaction virtual game piece may have a second appearance (e.g., broken egg; not shown).

At block 816, the processor 432 monitors interaction between the user-controlled virtual game piece and the interaction virtual game piece. The processor 432 monitors the interaction between the user-controlled virtual game piece and the interaction virtual game piece. In one example, the processor 432 monitors a distance between the user-controlled virtual game piece (e.g., the hand 902) and the interaction virtual game piece (e.g., the other hand 904) are within a threshold distance. In another example, the processor 432 monitors when the user-controlled virtual game piece (e.g., the sandwich 1006) is in contact with the interaction virtual game piece (e.g., the egg 1008).

At block 818, the processor 432 generates a score responsive to the interaction between the user-controlled virtual game piece and the interaction virtual game piece. In one example, the processor 432 increments a counter, e.g., for display to a user on the image display 180, when the distance between the user-controlled virtual game piece (e.g., the hand 902) and the interaction virtual game piece (e.g., the other hand 904) is within a threshold distance (e.g., representing a slap or high-five). In another example, the processor 432 increments a counter at a predefined rate, e.g., once per second, while the user-controlled virtual game piece (e.g., the sandwich 1006) and the interaction virtual game piece (e.g., the egg 1008) are in contact with one another (e.g., representing that the egg 1008 is balancing on the sandwich 1006). In another example, the processor 432 increments a counter for each step a user takes, while the user-controlled virtual game piece (e.g., the sandwich 1006) and the interaction virtual game piece (e.g., the egg 1008) are in contact with one another (e.g., representing that the egg 1008 is balancing on the sandwich 1006). A step may be determine by continuously monitoring the position of the eyewear device 100 and incrementing the counter when the distance exceeds a predefined step size of the user or by monitoring a inertial measurement unit in the eyewear device and incrementing the counter in response to measurements indicative of a step.

Figure 8B:
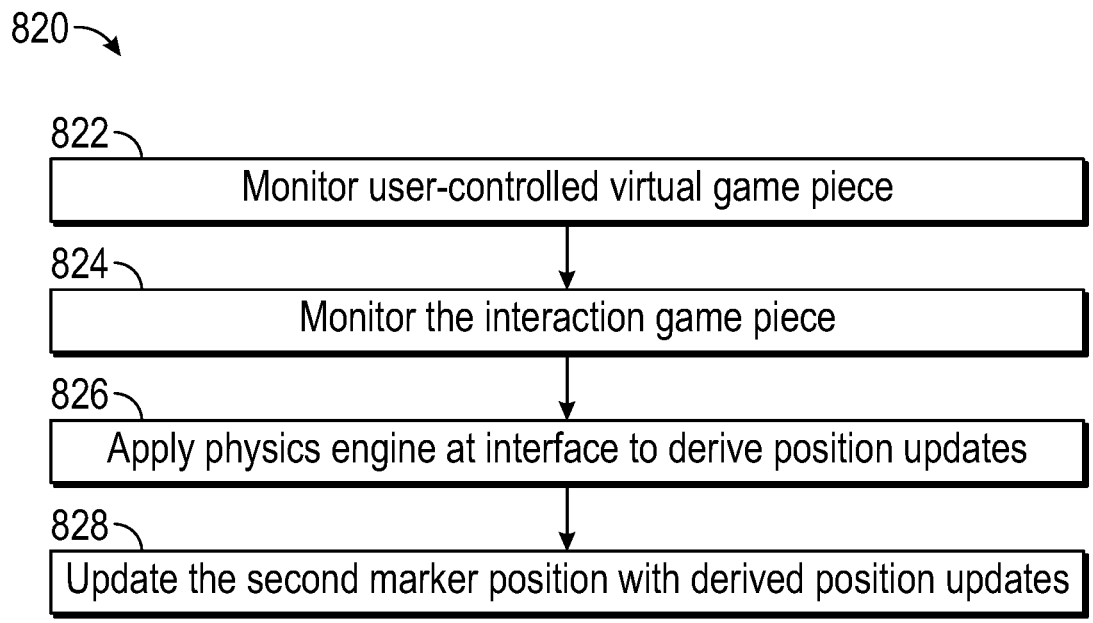
Figure 10D:
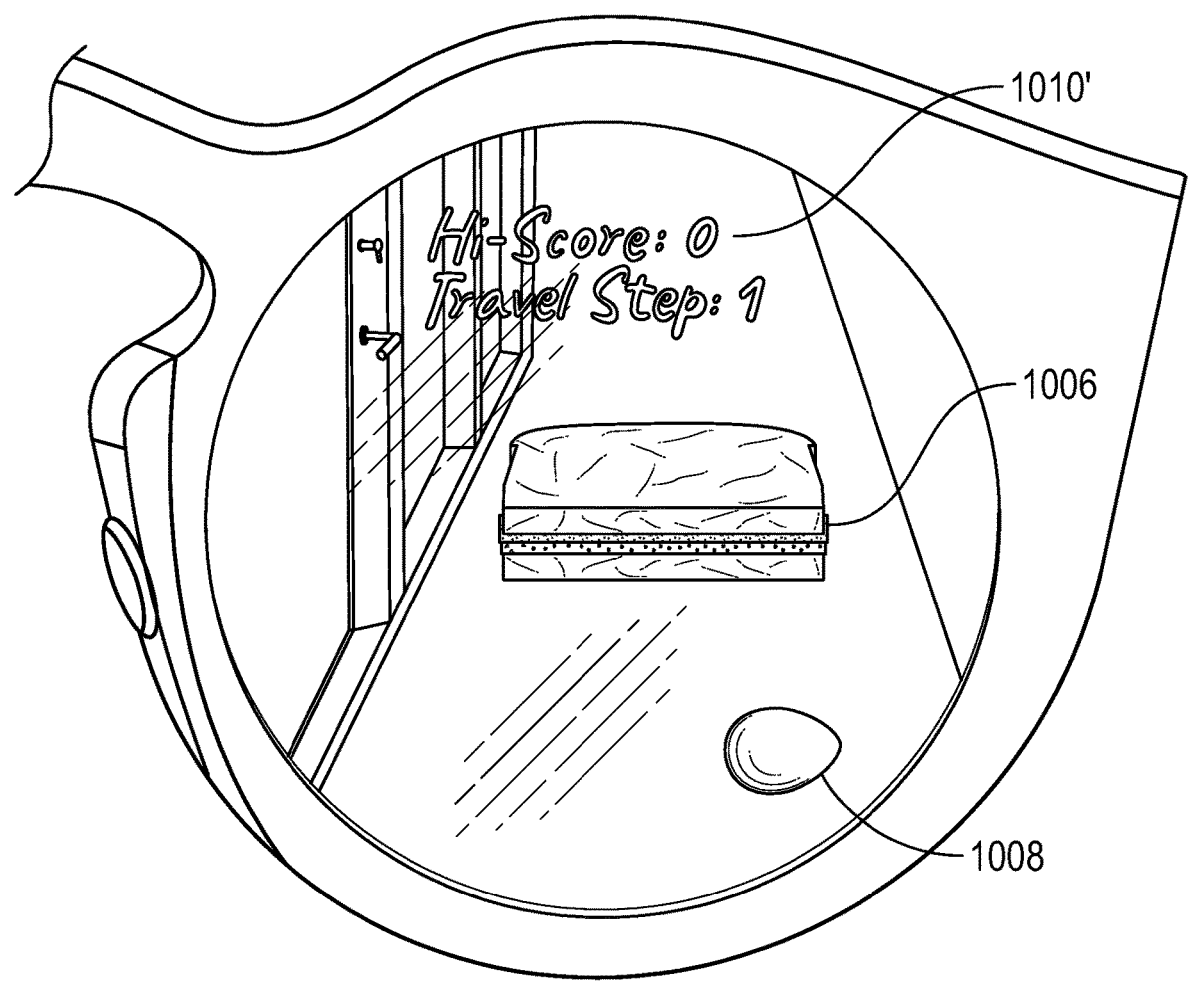

FIG. 8B depicts a flow chart 820 of example steps for updating the second marker position associated with the interaction virtual game piece. At block 822, the processor 432 monitors the user-controlled virtual game piece. The processor 432 may monitor a planar surface (e.g., a top planar surface of a mesh 1014 defining the user-controlled virtual game piece such as depicted in FIG. 10G) that is defined with respect to the position of the first marker.

At block 824, the processor 432 monitors the interaction virtual game piece. The processor 432 may monitor a surface (e.g., a spheroidal surface of a mesh 1014 defining the interaction virtual game piece such as depicted in FIG. 10H) that is defined with respect to the position of the second marker.

At block 826, the processor 432 applies a physics engine 468 at the interface between the user-controlled virtual game piece and the interaction virtual game piece to derive position updates. For example, as the monitored position of the top planar surface of the mesh defining the user-controlled virtual game piece tilts, the physics engine 468 will derive position updates for the interaction virtual game piece. The physics engine 468 may take into account the spheroidal surface of a mesh defining the interaction virtual game piece, the degree and direction of tilt of the planar mesh surface of the user-controlled virtual game piece, applicable gravity, and applicable friction to derive position updates.

At block 828, the processor 432 updates the second marker position with the derived position updates and, thus, the viewed position of the interaction virtual game piece. For example, as the top planar surface of the user-controlled virtual game piece tilts, the spheroidal interaction game piece will appear to roll in a downward direction along the surface of the user-controller virtual game piece.

Figure 8C:
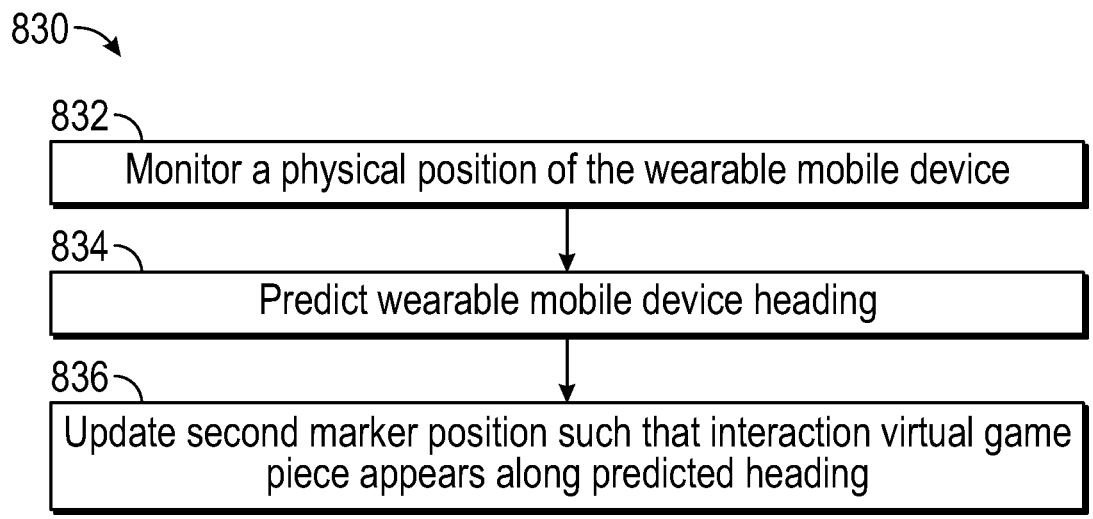

FIG. 8C depicts a flow chart 830 of example steps for another technique to update the second marker position associated with the interaction virtual game piece. At block 832, the processor 432 monitor a physical position of the eyewear device 100. The processor 432 may monitor the physical position (location and orientation) of the eyewear device 100 through vision position techniques, the inertial measurement unit 472, GPS unit 473, or a combination thereof.

At block 834, the processor 432 predicts a heading of the eyewear device 100. The processor 432 may predict the heading of the eyewear device 100 based on data from the inertial measurement unit 472, visual cues in the environment (e.g., an upcoming corner of a hallway), or a combination thereof. For example, if the IMU 472 produces data indicating the user is turning to the left, the processor 432 predicts a heading that is to the left of the current heading, with the degree to the left depending on the magnitude of the signals from the IMU 472. In another example, if a hallway is curving to the right, the processor 432 predicts a heading that is to the right of the current heading, with the degree to the right depending on how gentle/sharp the curve in the hallway. Where both IMU 472 data and image data are used, the data from the IMU 472 and the images may be weighted to match the desired outcome in different situations.

At block 836, the processor 432 updates the second marker position such that the interaction virtual game piece appears along the predicted heading. This causes the interaction virtual game piece to appear along the path the user is likely to travel.

Figure 8D:
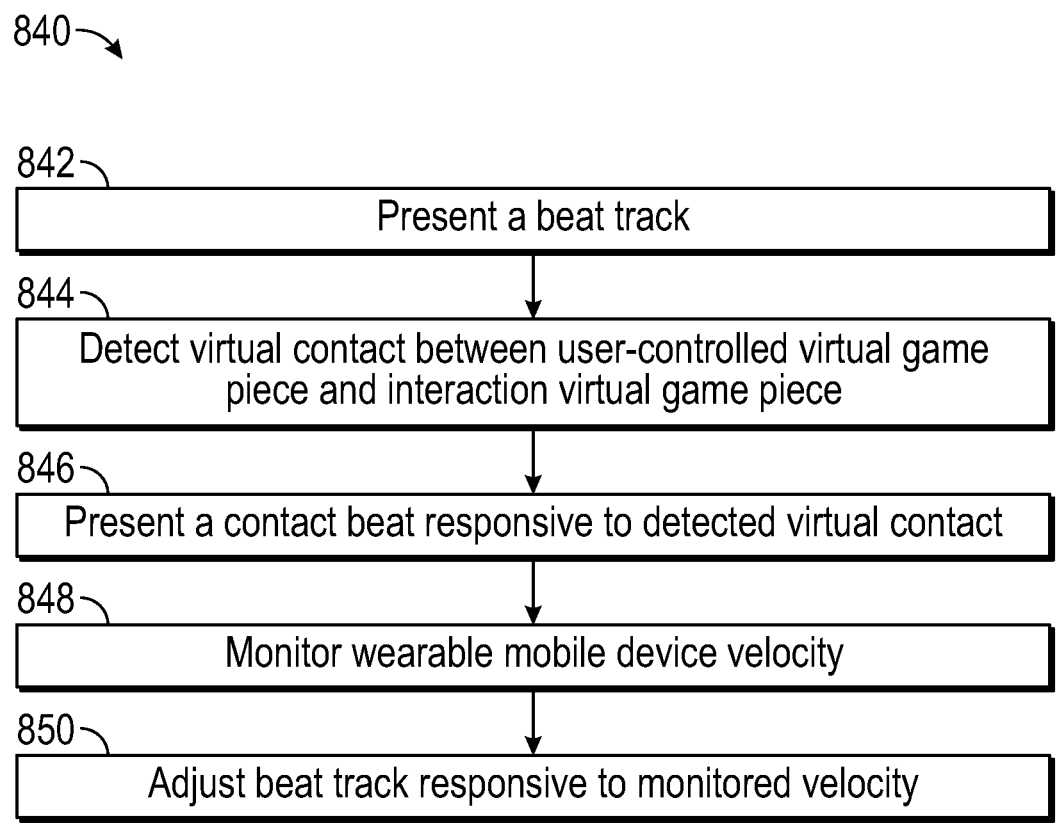

FIG. 8D depicts a flow chart 840 of example steps for combining sound with the visual effects to enhance the interactive augmented reality experience. At block 842, the processor 432 presents a beat track. The beat track may be a piece of music including a beat (i.e., a regularly repeating and distinguishable audible pulse) that it retrieves from song files 482 in memory 434. The processor 432 may present the beat track using audio processor 443 and speakers 440.

At block 844, the processor 432 detects virtual contact between user-controlled virtual game piece and interaction virtual game piece. The processor 432 monitors the interaction as described above with reference to block 816 in order to detect when, for example, the user-controlled virtual hand contacts the interaction virtual hand.

At block 846, the processor 432 presents a contact beat responsive to the detected virtual contact between the user-controlled virtual game piece (e.g., the hand 902) and the interaction virtual game piece (e.g., the other hand 904). Audio processor 443 may present the contact beat via speakers 442 under control of processor 432. The contact beat is a distinguishable audio pulse. The audio processor 443 may increase the intensity for the contact beat the closer it is to a beat of the beat track in order to provide the user with feedback on the timing of the virtual contact to increase the augmented reality experience.

In some examples, the image processor 412 may add additional visual features for display on the image display 180 to or surrounding the user-controlled virtual game piece or the interaction virtual game piece based on the temporal proximity of the virtual contact to a beat of the beat track. When the temporal difference is less than a first predefined amount but greater than a second predefined amount, a first image is added (e.g., a halo 908 around the hand 902). When the temporal different is less than the second predefined amount, a second image is added (e.g., lightning bolts; not shown).

At block 848, the processor 432 monitors the eyewear device 100 velocity. The processor 432 may monitor the velocity of the eyewear device 100 through vision positioning techniques over multiple frames, the inertial measurement unit 472, GPS unit 473, or a combination thereof.

At block 850, the processor 432 adjusts the beat track responsive to the monitored velocity. The audio processor 443 may adjust the beat track under control of processor 432. The audio processor 443 may speed up the beat track/decrease time between beats when the user speeds up and may slow down the beat track/increate time between beats when the user speeds up (e.g., such that the beat track is in synch with the steps taken by the user) in order to increase the augmented reality experience.

FIGS. 9A-E illustrate a "beat walk" augmented reality experience in which a user of an eyewear device 100 controls a user-controlled virtual game piece (a hand in the illustrated example) to contact ("slap") an interaction virtual game piece (another hand in the illustrated example). FIG. 9A depicts an opening image of the beat walk experience. In the opening image, the eyewear device 100 presents a hand 902 (which is a user-controlled virtual game piece) and another hand 904 (which is an interaction virtual game piece) and an image overlay on an optical assembly 180. The wearer/user of the eyewear device 100 views the image overlay against the backdrop of the physical environment in front of the eyewear device 100 (which is a hallway 906 in the illustrated example).

As the hand 902 approaches the other hand 904, the other hand 904 is changed from a closed hand 904 as illustrated in FIG. 9A to an open hand 904' as illustrated in FIG. 9B when the distance therebetween is less than a first predefined threshold. Additionally, when the hand 902 and the other hand 904' are within a second predefined threshold (which may be the same or different than the first predefined threshold), a visual indicator such as a halo 908 is added as an image overlay for viewing by the wearer to indicate a successful virtual hand slap or high-five. An audio signal may additionally be audibly presented by the eyewear device 100 at least substantially concurrently with the visual indicator to further enhance the interactive augmented reality experience. The processor 432 may additionally track and add a score 914 to the image overlay as depicted in FIG. 9E. The score 914 may represent, for example, the number of successful virtual hand slaps or high-fives during a game.

Figure 9C:
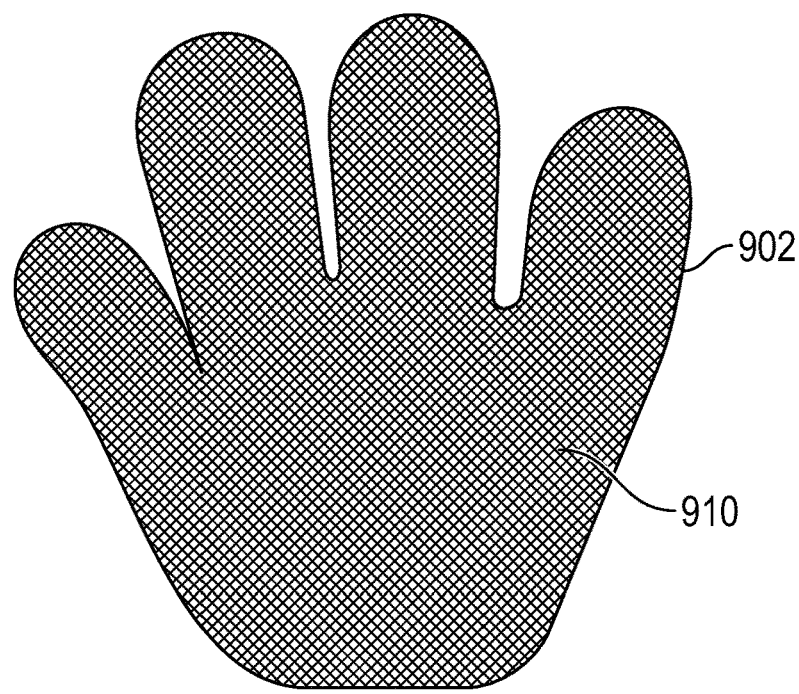
FIGS. 9C and 9D are perspective views of mesh representations of an example user-controlled virtual game piece and an example interaction virtual game piece, respectively, for use with the virtual high-five augmented reality experience of FIGS. 9A, 9B, and 9E.
Figure 9D:
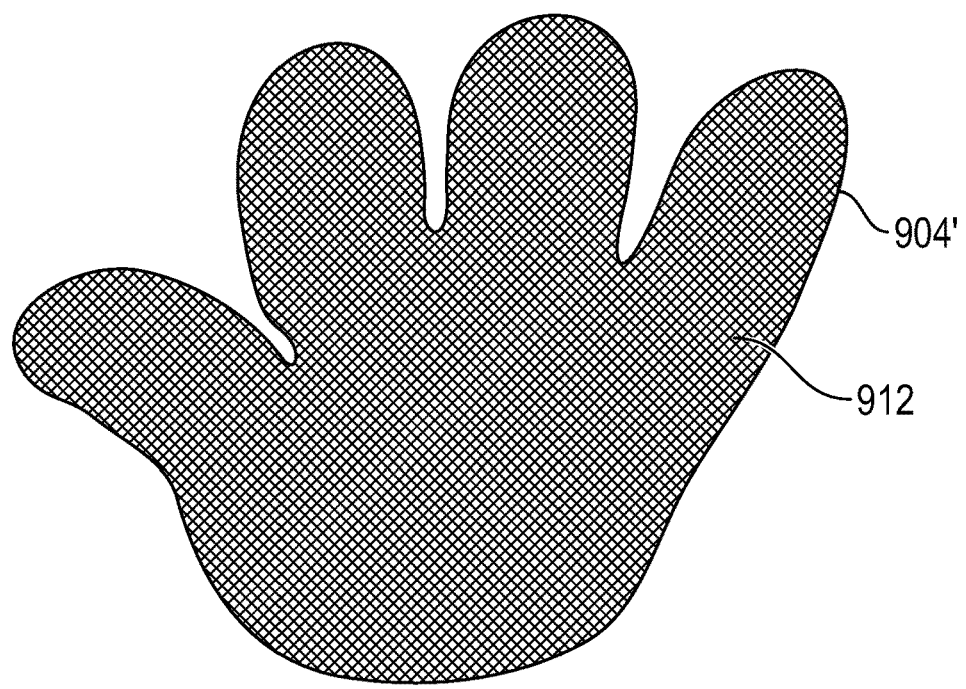
Figure 9E:
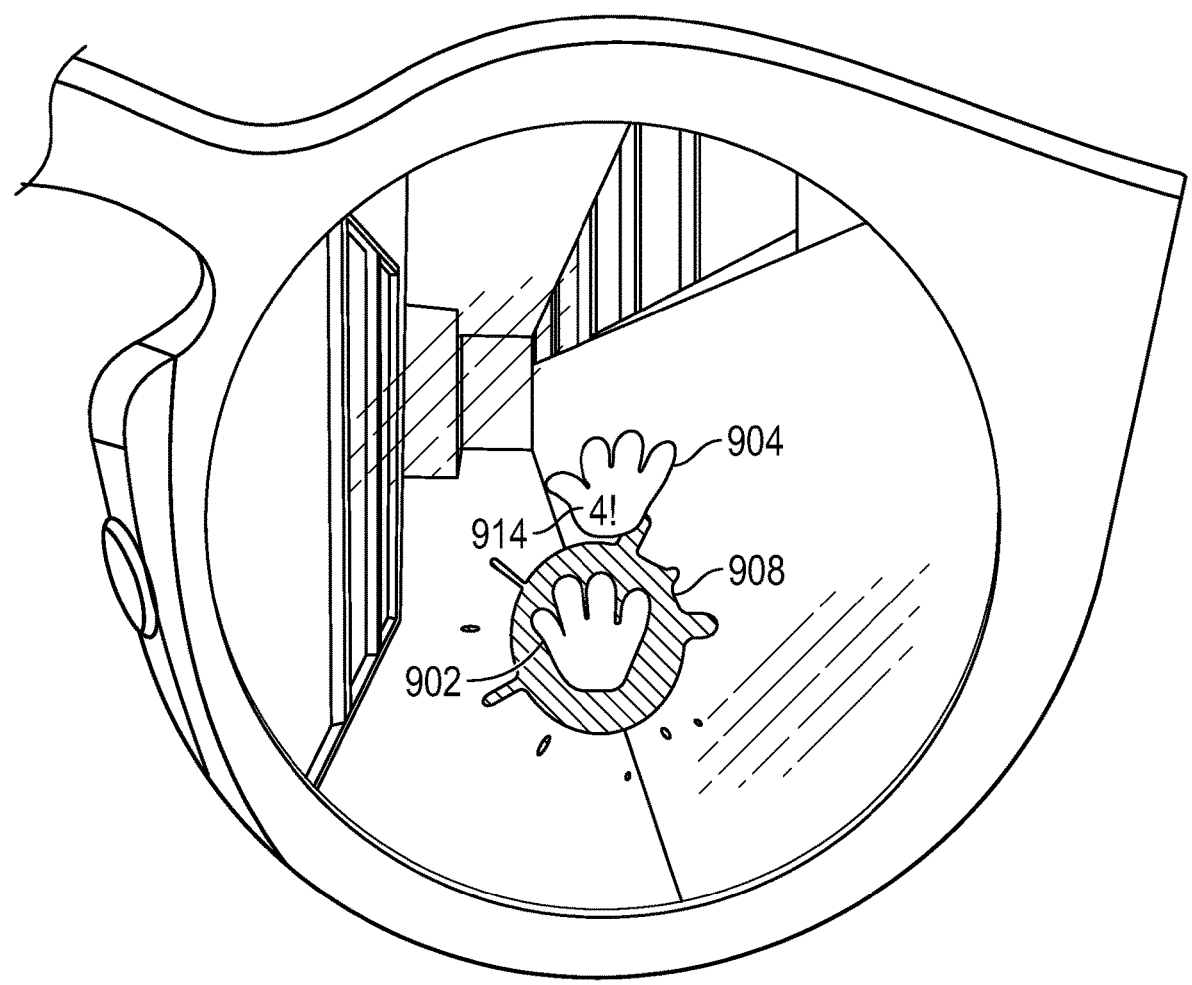

FIG. 9C depicts a mesh 910 representing the surface of the hand 902. FIG. 9D depicts a mesh 912 representing the surface of the other hand 904'. Each intersection of mesh lines represents a surface point on the meshes 910 and 912, which are defined with reference to the respective marker locations for the respective hands 902 and 904'. The processor 432 tracks the relative position of surface points between the two hands to determine the distance between the two hands. More or fewer mesh lines/surface points may be used depending on the desired accuracy and available processing power.

FIGS. 10A-H illustrate a "spheroidal balancing" augmented reality experience in which a user of an eyewear device 100 controls a user-controlled virtual game piece (a sandwich 1006 in the illustrated example) to balance an interaction virtual game piece (an egg 1008 or other spheroidal shape in the illustrated example) on the user-controlled virtual game piece. FIG. 10A depicts an opening image of the spheroidal balancing experience. In the opening image, the eyewear device 100 presents an opening message 1002 ("tap to start" in the illustrated example). The processor 432 presents the opening message 1002 as an image overlay on an optical assembly 180. The wearer of the eyewear device 100 views the image overlay against the backdrop of the physical environment in front of the eyewear device 100 (which is a hallway 1004 in the illustrated example).

The wearer may start the game by, for example, tapping a user input 181 on a temple 125 of the eyewear device 100 with an index finger. FIG. 10B depicts a starting image of the game in which the egg 1008 (which is an interaction virtual game piece) is positioned on a top planar surface of the sandwich 1006 (which is a user-controlled virtual game piece). The processor 432 presents the game pieces 1006 and 1008 as image overlays on the optical assembly 180. The processor 432 may additionally track and add a score 1010 to the image overlay. The score 1010 may represent, for example, the number of steps a wear takes while the egg 1008 remains on top of the sandwich 1006. For example, as shown in FIG. 10D, the score 1010' is incremented to represent the wearer took one step before the egg 1008 fell off the sandwich 1006.

As the sandwich 1006 is tilted by the user through movement of the eyewear device 100, the processor 432 moves the egg 1008 (see FIG. 10C), taking into account physics principles such as gravity and friction using a physics engine 468. The processor 432 continuously updates position (location and orientation) of the game pieces and presents the game pieces 1006 and 1008 as image overlays on the optical assembly 180.

Figure 10E:
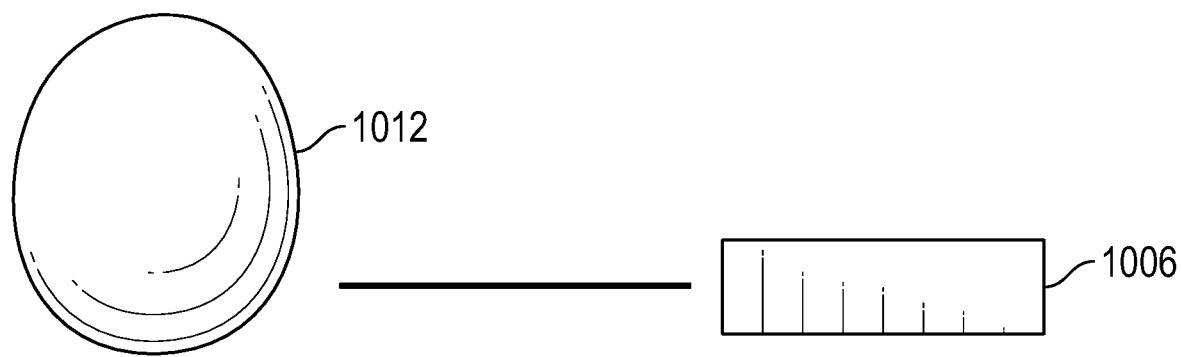
FIGS. 10E and 10F are side views illustrating control of the user-controlled virtual game piece of FIGS. 10A, 10B, 10C, and 10D.
Figure 10F:
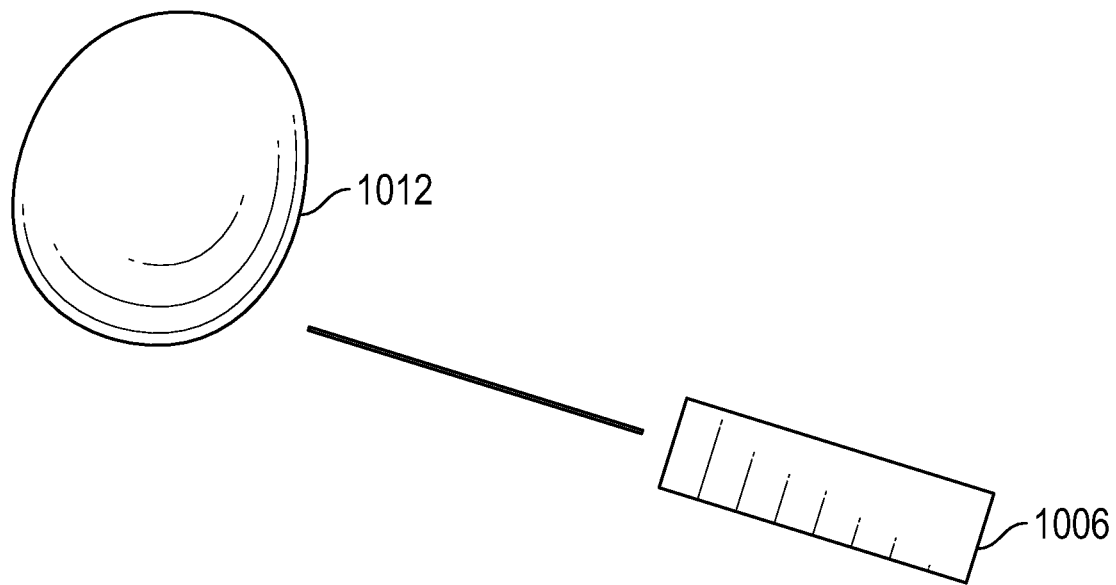
Figure 10G:
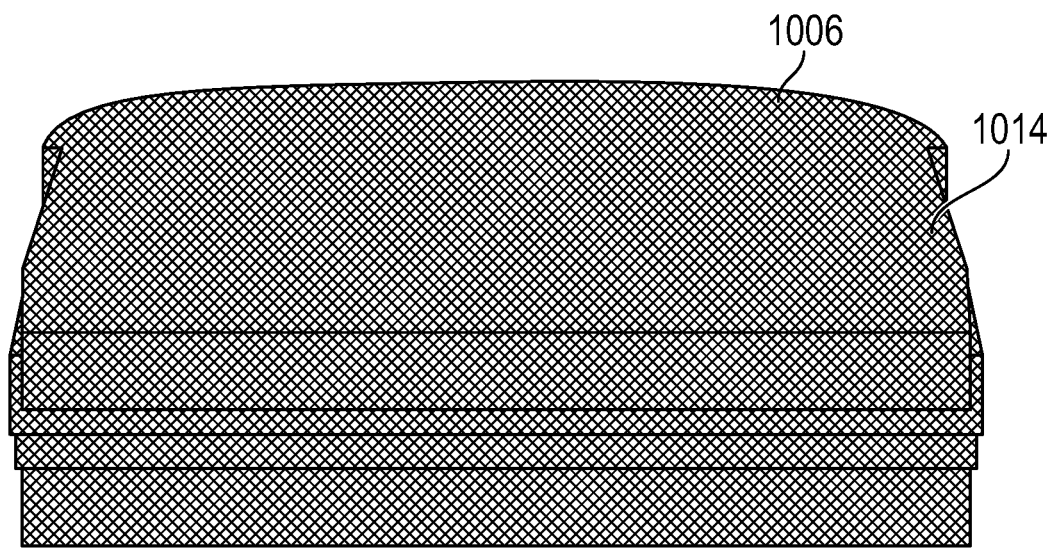
FIGS. 10G and 10H are perspective views of mesh representations of an example user-controlled virtual game piece and an example interaction virtual game piece, respectively, for use with the virtual spheroidal balancing augmented reality experience of FIGS. 10A, 10B, 10C, and 10D.
Figure 10H:
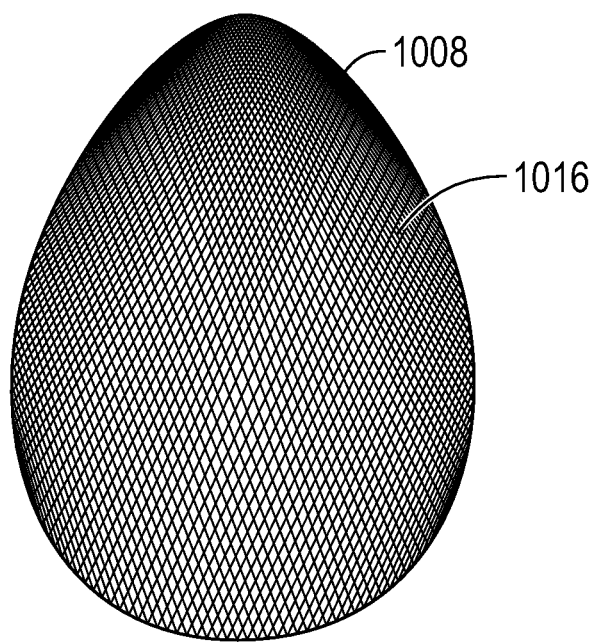

FIGS. 10E and 10F illustrate control of the interaction game piece in two dimensions (i.e., up/down along the z-axis and pitch rotation about the y-axis of the sandwich 1006 in this example). Although two dimensions are illustrated, any combination of one or more dimensions in six degrees of freedom (pitch, yaw, roll, x-axis, y-axis, z-axis) may be adjusted based on the orientation of the eyewear device 100. In the illustrated example, when the wearer is looking straight ahead (assuming the head 1012 of the wearer is not tilting to the left or the right), the sandwich 1006 is presented as flat in front of the wearer. When the wearer tilts his head down (which is detected by the processor 432), the sandwich 1006 tilts and moves downward. Tilting the head 1012 to the left of the right would cause the sandwich 1006 to tilt (i.e., roll rotation about the x-axis).

FIG. 10G depicts a mesh 1014 representing the surface of the sandwich 1006. FIG. 10H depicts a mesh 1016 representing the surface of the egg 1008. Each intersection of mesh lines represents a surface point on the meshes 1014 and 1016, which are defined with reference to the respective marker locations for the sandwich 1006 and the egg 1008, respectively. The processor 432 tracks the relative position of surface points between the sandwich 1006 and the egg 1008 to determine whether the egg 1008 is still in contact with the top surface of the sandwich 1006. More or fewer mesh lines/surface points may be used depending on the desired accuracy and available processing power.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An interactive augmented reality system comprising:
a position detection system;
a display system;
an eyewear device comprising the position detection system, the display system, a processor, and a memory; and
programming in the memory, wherein execution of the programming by the processor configures the eyewear device to perform functions, including functions to:
register, with the position detection system, a first marker position for a user-controlled virtual game piece, the first marker position defined with respect to the eyewear device and responsive to movement of the eyewear device;
present the user-controlled virtual game piece on the display system at the first marker position;
register, with the position detection system, a second marker position for an interaction virtual game piece, the second marker position defined with respect to the eyewear device;
present the interaction virtual game piece on the display system at the second marker position;
update the first marker position responsive to movement of the eyewear device;
monitor interaction between the user-controlled virtual game piece and the interaction virtual game piece as the first marker position updates; and
generate a score responsive to a duration of time the user-controlled virtual game piece is in contact with the interaction virtual game piece during the monitored interaction.

2. The system of claim 1, wherein the position detection system comprises:
a camera coupled to the eyewear device, the camera configured to capture sequences of frames of video data, wherein each frame of video data comprises depth information for a plurality of pixels.

3. The system of claim 1, wherein the display system comprises:
a see-through display supported by the eyewear device to present the user-controlled virtual game piece and the interaction virtual game piece.

4. The system of claim 1, further comprising:
a physics engine;
wherein execution of the programming by the processor further configures the eyewear device to:
monitor the user-controlled virtual game piece;
monitor the interaction virtual game piece;
apply the physics engine at an interface between user-controlled virtual game piece and the interaction virtual game piece to derive position updates for the second marker position; and
update the second marker position with the derived position updates.

5. The system of claim 1, further comprising:
a prediction engine;
wherein execution of the programming by the processor further configures the eyewear device to:
monitor, with the position detection system, a physical position of the eyewear device;
predict, with the prediction engine, a heading of the eyewear device; and
update the second marker position such that the interaction virtual game piece appears along the predicted heading.

6. The system of claim 5, further comprising:
an audio system;
wherein execution of the programming by the processor further configures the eyewear device to:
present, by the audio system, a beat track;
detect virtual contact between the user-controlled virtual game piece and the interaction virtual game piece; and
present a contact beat responsive to the detected virtual contact.

7. The system of claim 5, wherein the eyewear device further comprises an audio system and wherein the system further comprises:
present, by the audio system, a beat track;
monitor, with the position detection system, a velocity of the eyewear device; and
adjust the beat track responsive to the monitored velocity of the eyewear device.

8. An interactive augmented reality method for use with an eyewear device having a position detection system and a display system, the method comprising:
registering, with the position detection system, a first marker position for a user-controlled virtual game piece, the first marker position defined with respect to the eyewear device and responsive to movement of the eyewear device;
presenting the user-controlled virtual game piece on the display system at the first marker position;
registering, with the position detection system, a second marker position for an interaction virtual game piece, the second marker position defined with respect to the eyewear device;
presenting the interaction virtual game piece on the display system at the second marker position;
updating the first marker position responsive to movement of the eyewear device;
monitoring interaction between the user-controlled virtual game piece and the interaction virtual game piece as the first marker position updates; and
generating a score responsive to a duration of time the user-controlled virtual game piece is in contact with the interaction virtual game piece during the monitored interaction.

9. The method of claim 8, wherein the eyewear device is an eyewear device and the display system includes a see-through display supported by the eyewear device and wherein the presenting steps comprise:
presenting the user-controlled virtual game piece and the interaction virtual game piece on the see-through display.

10. The method of claim 8, further comprising:
updating the second marker position;
wherein the monitoring interaction includes monitoring interaction between the user-controlled virtual game piece and the interaction virtual game piece as the first marker position and the second marker position update.

11. The method of claim 10, wherein the eyewear device further has a physics engine and wherein the updating the second marker position comprises:
monitoring the user-controlled virtual game piece;
monitoring the interaction virtual game piece;
applying the physics engine at an interface between user-controlled virtual game piece and the interaction virtual game piece to derive position updates for the second marker position; and
updating the second marker position with the derived position updates.

12. The method of claim 11, wherein the duration of time is determined by:
starting a timer while the interaction virtual game piece is in virtual contact with the user-controlled virtual game piece; and
stopping the timer when the interaction virtual game piece is no longer in virtual contact with the user-controlled virtual game piece;
wherein the score increases responsive to the timer.

13. The method of claim 11, further comprising:
identifying a starting position corresponding to the user-controlled virtual game piece while the interaction virtual game piece is in virtual contact with the user-controlled virtual game piece;
monitoring a current position of the user-controlled virtual game piece while the interaction virtual game piece is in virtual contact with the user-controlled virtual game piece; and
adjusting the score responsive to a distance between the identified starting position and the monitored current position.

14. The method of claim 11, wherein the user-controlled virtual game piece includes a planar surface and the interaction virtual game piece has a spheroidal surface, orientation of the planar surface is responsive to the position of the eyewear device, and the position of the spheroidal surface is responsive to the interface between the planar surface and the spheroidal surface.

15. The method of claim 10, wherein the eyewear device further has a prediction engine and wherein the updating the second marker position comprises:
monitoring, with the position detection system, a physical position of the eyewear device;
predicting, with the prediction engine, a heading of the eyewear device; and
updating the second marker position such that the interaction virtual game piece appears along the predicted heading.

16. The method of claim 15, further comprising:
detecting virtual contact between the user-controlled virtual game piece and the interaction virtual game piece; and
increasing the score responsive to the detected virtual contact.

17. The method of claim 15, wherein the eyewear device further comprises an audio system and wherein the method further comprises:
presenting, by the audio system, a beat track;
detecting virtual contact between the user-controlled virtual game piece and the interaction virtual game piece; and
presenting a contact beat responsive to the detected virtual contact.

18. The method of claim 15, wherein the eyewear device further comprises an audio system and wherein the method further comprises:
presenting, by the audio system, a beat track;
monitoring, with the position detection system, a velocity of the eyewear device; and
adjusting the beat track responsive to the monitored velocity of the eyewear device.

19. A non-transitory computer-readable medium storing program code which, when executed, is operative to cause an electronic processor to perform the steps of:
capturing sequences of frames of video data with a camera, wherein each frame of video data comprises depth information for a plurality of pixels, and wherein the camera is coupled to an eyewear device comprising a processor, a memory, and a display;
registering, with a position detection system, a first marker position for a user-controlled virtual game piece, the first marker position defined with respect to an eyewear device and responsive to movement of the eyewear device;
presenting the user-controlled virtual game piece on a display system of the eyewear device at the first marker position;
registering, with the position detection system, a second marker position for an interaction virtual game piece, the second marker position defined with respect to the eyewear device;
presenting the interaction virtual game piece on a display system of the eyewear device at the second marker position;
updating the first marker position responsive to movement of the eyewear device;
monitoring interaction between the user-controlled virtual game piece and the interaction virtual game piece as the first marker position updates; and
generating a score responsive to a duration of time the user-controlled virtual game piece is in contact with the interaction virtual game piece during the monitored interaction.

20. The non-transitory computer-readable medium storing program code of claim 19, wherein the program code, when executed, is operative to cause electronic processor to perform the further steps of:
presenting, by an audio system, a beat track;
monitoring, with the position detection system, a velocity of the eyewear device; and
adjusting the beat track responsive to the monitored velocity of the eyewear device.

* * * * *